(12) United States Patent
Heston

(10) Patent No.: US 10,604,361 B2
(45) Date of Patent: Mar. 31, 2020

(54) CASE MANIPULATOR FOR A PALLETIZER SYSTEM

(71) Applicant: Top Tier, LLC, Clackamas, OR (US)

(72) Inventor: Stephen L. Heston, West Linn, OR (US)

(73) Assignee: Top Tier, LLC, Clackamas, OR (US)

( * ) Notice: Subject to any disclaimer, the term of this patent is extended or adjusted under 35 U.S.C. 154(b) by 0 days.

(21) Appl. No.: 15/947,952

(22) Filed: Apr. 9, 2018

(65) Prior Publication Data

US 2018/0222693 A1    Aug. 9, 2018

Related U.S. Application Data

(63) Continuation of application No. 15/261,751, filed on Sep. 9, 2016, now Pat. No. 9,950,878.

(51) Int. Cl.
| | |
|---|---|
| *B65G 47/24* | (2006.01) |
| *B65G 57/09* | (2006.01) |
| *B65G 47/08* | (2006.01) |
| *B65G 47/82* | (2006.01) |
| *B65G 57/24* | (2006.01) |

(Continued)

(52) U.S. Cl.
CPC ........... *B65G 57/09* (2013.01); *B65G 47/082* (2013.01); *B65G 47/086* (2013.01); *B65G 47/82* (2013.01); *B65G 57/03* (2013.01); *B65G 57/24* (2013.01); *B65G 57/26* (2013.01)

(58) Field of Classification Search
CPC .. B65G 47/086; B65G 47/244; B65G 47/084; B65G 47/82; B65G 57/24; B65G 57/26; A01D 85/005; A01D 90/00; A01D 90/08

USPC ...... 198/374, 375, 377.06, 377.07, 379, 411, 198/416, 426, 429, 432, 440, 891.1; 414/768, 769, 770, 771, 773, 776, 791.4, 414/791.6, 792, 792.1, 792.4, 792.6, 414/792.7, 799, 922

See application file for complete search history.

(56) References Cited

U.S. PATENT DOCUMENTS

| | | | | |
|---|---|---|---|---|
| 3,586,176 A | * | 6/1971 | Rackman ................. | B25J 9/026 414/792 |
| 3,820,302 A | * | 6/1974 | Doran ....................... | B65B 5/08 53/544 |

(Continued)

FOREIGN PATENT DOCUMENTS

EP    2279971 A1 *  2/2011  ........... B65G 47/086

*Primary Examiner* — Gregory W Adams
(74) *Attorney, Agent, or Firm* — Hancock Hughey LLP

(57) ABSTRACT

A case manipulator receives cases from an infeed conveyer and manipulates individual cases or groups of cases and transfers the manipulated cases to a row accumulator platform in a desired and pre-determined orientation and positioned on the accumulator platform to a desired and pre-determined location. The manipulation of individual cases, or groups of cases, is continued in a sequential operation until a complete row is formed on the accumulator platform according to a pre-determined build menu. The case manipulator includes a swing plate pivotal on a first axis and a paddle arm that is attached to the swing plate and pivotal on a second axis that is transverse to the first axis. The invention allows the palletizer to have the next case in a row transferred from the infeed conveyer to the row-build staging area while the case manipulator is operating on an already-delivered case.

19 Claims, 17 Drawing Sheets

(51) Int. Cl.
*B65G 57/03* (2006.01)
*B65G 57/26* (2006.01)

(56) References Cited

U.S. PATENT DOCUMENTS

| | | | | |
|---|---|---|---|---|
| 5,445,493 | A * | 8/1995 | Yourgalite | B65G 61/00 198/374 |
| 5,758,471 | A * | 6/1998 | Denley | B65B 11/045 53/399 |
| 7,703,596 | B1 * | 4/2010 | Grollitsch | B65G 47/252 193/48 |
| 8,392,017 | B2 * | 3/2013 | Trygg | B65G 57/24 414/791.4 |
| 9,126,770 | B1 * | 9/2015 | Widder | B65G 57/02 |
| 9,205,997 | B1 * | 12/2015 | Hogan | B65G 47/54 |
| 9,950,878 | B2 * | 4/2018 | Heston | B65G 47/082 |
| 2009/0010749 | A1 * | 1/2009 | Germain | B65G 47/086 414/801 |
| 2018/0072510 | A1 * | 3/2018 | Rollwa | B65G 43/08 |

* cited by examiner

CASE MANIPULATOR FOR A PALLETIZER SYSTEM

TECHNICAL FIELD

The present invention relates to palletizing systems and more specifically to a case manipulator apparatus and method that is used to insure that cases delivered to a row building component of a palletizer are delivered in the correct orientation and with the proper spacing.

BACKGROUND

A palletizer is an apparatus that receives and manipulates items, such as boxes, also called cases, and places the manipulated items on pallets in pre-determined positions and orientations in organized rows, layers and stacks to form a stable stack of boxes arranged on a pallet for shipping. Palletizers are often combined with stretch wrapping machines that are either a component of the palletizer assembly itself or a separate machine. In either case, the stretch wrapping machine overwraps the stack of cases that the palletizing machine has deposited on the pallet in order to form a highly stable load that is ready for shipping and which will remain stable throughout the shipping process.

There are innumerable devices for palletizing articles, but described in a very general sense all palletizers receive a sequence of items and manipulate those items to produce a palletized stack of them. As noted, typically, a completed stack of cases is shrink wrapped as part of the palletizing operation in order to finalize the stack for shipping.

Stated in very general terms, a typical palletizer receives a series of items from an infeed conveyer, organizes the items into one or more rows on a row build conveyer, organizes the rows into layers on a component such as a layer head, and generates a stack of layers on a pallet. Depending on the type of machine, complete rows of cases may be transferred to onto a pallet or a complete layer of items (i.e., multiple rows of items) may be assembled and transferred at once onto a pallet.

Efficient shipping of palletized items calls for efficient stacking of items on the pallet to minimize open space within the stack and to help insure the stability of the stack to prevent relative movement between items, and ultimately, to insure that the items in the stack arrive at their destination undamaged. Of course, boxes come in a variety of sizes and many boxes are rectangular with opposed parallel side panels and therefore have different width and length dimensions. A standard pallet is used widely throughout the shipping industry. By varying the orientation and/or pattern of boxes from layer to layer, a stable stack of items may be constructed upon a standard-sized pallet. Accordingly, a variety of "box patterns" have been established for stacking specific box sizes on standard pallets. By using an established box pattern for given rectangular boxes that are to be stacked on a standard pallet, the result is an efficient and stable stack of the boxes on the pallet that will perform well during shipping and handling. Modern palletizers are under the control of a microprocessor that controls all aspects of the palletizing operation. Among other things, the controller has pre-determined "build menus" that correspond to box patters and which are specific to specific box dimensions and pallet load specifications. During operation of the palletizer, the build menu determines how the palletizer orients and arranges the plural boxes so that the finalized stack on the pallet is optimally stable.

A common palletizing system comprises several components that work together to perform the palletizing operation. Boxes are initially placed on an infeed system that delivers the boxes to a row build system. Often the infeed system includes box turning equipment that orients individual boxes in the correct orientation relative to adjacent boxes for the specific box pattern that is being used. Rows are assembled on the row build system—each row is a set of plural boxes arranged according to the box pattern as set by the build menu. A row is transferred by one of a variety of methods from the row build system to a layer building station where plural rows are arranged into a layer. A stack is formed by depositing a first layer onto a pallet or slip sheet and subsequent layers are deposited atop the next adjacent lower layer. Layers are added until the stack is complete. Typically, the palletizing operations at the various stations run simultaneously to the extent possible to increase throughput efficiency. As would be expected, there are many variations of the equipment used to palletize, and the general themes of operation.

Regardless of the equipment that is being used, palletizing requires efficiency in design and operation of the device. Among other design and operational criteria, efficiency is often one of the most important considerations. In many applications, time is most critical and a palletizer that more quickly organizes an incoming series of items into a palletized stack of items represents an advantage by increasing throughput and thus greater production levels and economic efficiency.

That said, different operations have different requirements for palletizing equipment. A high speed, high throughput palletizer might be appropriate for a high volume manufacturer but a lower speed system would be just as appropriate for a lower volume manufacturer. As would be expected, the higher speed palletizing systems tend to be more expensive than the lower speed system. Therefore, there is a need in the marketplace for many different palletizing systems that meet the variety of needs of the consumers of these systems.

It will be appreciated that mishandling of boxes in the palletizing process should be minimized as part of an efficient operation and that a palletizing system must be designed to avoid delivery of boxes to the palletizer in an incorrect orientation. For example, a box that is delivered to a palletizer in the incorrect orientation for the specific box pattern that is being used will cause formation of a defective layer. This results in shut down, or at least significant slowdown of the entire palletizing sequence and operator intervention is often required in order to correct the orientation of the mis-oriented box. Unfortunately, delivery of such "out of bounds" boxes—that is, boxes that are either in the incorrect orientation or which are otherwise improperly placed—to palletizing systems continues to be a significant problem and is the cause of much slowdown in palletizing operations. Moreover, any time operator intervention is required to correct out of bounds situations presents a safety concern for workers.

There is a need therefore for a palletizing system that insures delivery of boxes to the equipment in the correct orientation and spacing for whatever box pattern is being used. At the same time, there is a need for a palletizing system that meets the economies of the consumer's specific needs.

The present invention comprises systems that address the shortcomings of prior systems and is directed to a case manipulator that accurately and precisely positions cases on a row build system according to a pre-determined build menu. The case manipulator according to the present invention is capable of receiving cases from an infeed conveyer, manipulating individual cases when received from the infeed conveyer, transferring the manipulated cases to a row accumulator platform in a desired and pre-determined orientation and positioned on the accumulator platform to a desired and pre-determined location. The manipulation of individual cases, or groups of cases, is continued in a sequential operation until a complete row is formed on the accumulator platform according to the build menu. The invention allows the palletizer to have the next case in a row transferred from the infeed conveyer to the row-build staging area while the case manipulator is operating on an already-delivered case. These and other benefits are described herein.

BRIEF DESCRIPTION OF THE DRAWINGS

The invention will be better understood and its numerous objects and advantages will be apparent by reference to the following detailed description of the invention when taken in conjunction with the following drawings in which the case manipulator of the invention is first shown in the context of an overall palletizing system in order to show environment, and the invention is then shown in isolation in order to provide details.

FIG. 1 is an upper perspective view showing a palletizing system, including the frame elements that support the various components.

FIG. 2 is a top plan view of the palletizing system shown in FIG. 1.

FIG. 9 shows cases being delivered to the case manipulator on an infeed conveyer;

FIG. 10 illustrates the transfer of a case from the infeed conveyer onto the row accumulator platform by the case manipulator according to the invention.

FIG. 11 is similar to FIG. 10 and shows one possible step in the process of using the case manipulator to transfer and position a case on the row accumulator platform.

FIG. 12 shows a possible next sequential operation relative to FIG. 11.

FIG. 13 is a possible next sequential operation relative to FIG. 12.

FIG. 14 is continues the possible next sequential operational step relative to FIG. 13.

FIG. 15 continues the operational sequence and illustrates a completed row of cases positioned by the case manipulator on the row accumulator platform.

FIG. 16 illustrates the row accumulator platform moving vertically relative to the infeed conveyer to begin the process of transferring a complete row of cases to downstream components such as the layer head.

FIG. 17 illustrates operation of the case manipulator according to the invention to rotate a case as the case is moved from the infeed conveyer to the row accumulator.

FIG. 18 shows a possible next sequential step from the illustration of FIG. 17.

FIG. 19 continues the sequence from FIG. 18 and shows the case manipulator moving back to the position in which another case will be acquired for transfer to the row accumulator from the infeed conveyer.

FIG. 20 is a possible next sequential step from FIG. 19.

FIG. 21 continues the sequence of steps from FIG. 20.

FIG. 22 is a possible next sequential step from FIG. 11.

FIG. 23 is a possible next sequential step from FIG. 22.

FIG. 24 is a possible next sequential step from FIG. 23.

FIG. 25 is a possible next sequential step from FIG. 24.

FIG. 26 is a perspective view of an alternative apparatus for transporting rows of cases, namely, a pick and place clamp system that may be used with the case manipulator according to the present invention.

FIG. 27 is a side elevation view of selected operative components of the pick and place clamp system shown in FIG. 26, showing the components with a case.

FIG. 28 is a perspective view of the alternative apparatus for transporting rows of cases shown in FIG. 26 but in FIG. 28 the row of cases has been lifted off the row accumulator by the pick and place clamp system.

DETAILED DESCRIPTION OF ILLUSTRATED EMBODIMENTS

The invention will now be described in detail with reference to the drawings. Relative directional terms are used at times to describe components of the invention and relative positions of the parts. As a naming convention, the ground plane is considered to be the generally horizontal surface on which the apparatus of the present invention is mounted. In conventional installations, the apparatus is installed on a horizontal floor and the upper surface of the various conveyers, row build layers, layer heads, etc. described herein are also horizontal and thus parallel to the ground plane. Other relative directional terms correspond to this convention: "upper" refers to the direction above and away from the ground plane; "lower" is generally in the opposite direction, "inward" is the direction from the exterior toward the interior of the apparatus, "vertical" is the direction normal to the horizontal ground plane, and so on. "Upstream" refers to the direction that is the opposite of the flow of boxes on the system, and "downstream" is the opposite direction—the direction of the flow of boxes. The articles that are being manipulated on the palletizer described in this specification are standard boxes; in the industry, boxes are also interchangeably referred to as cases and cartons.

Furthermore, in most of the figures used herein some structures are omitted in order to better illustrate selected components and structures. This includes framing and support structures and the like used in palletizing systems. Such environmental components are well known to those of skill in the art and need not be described or shown in the figures to understand the invention.

Figure 1:
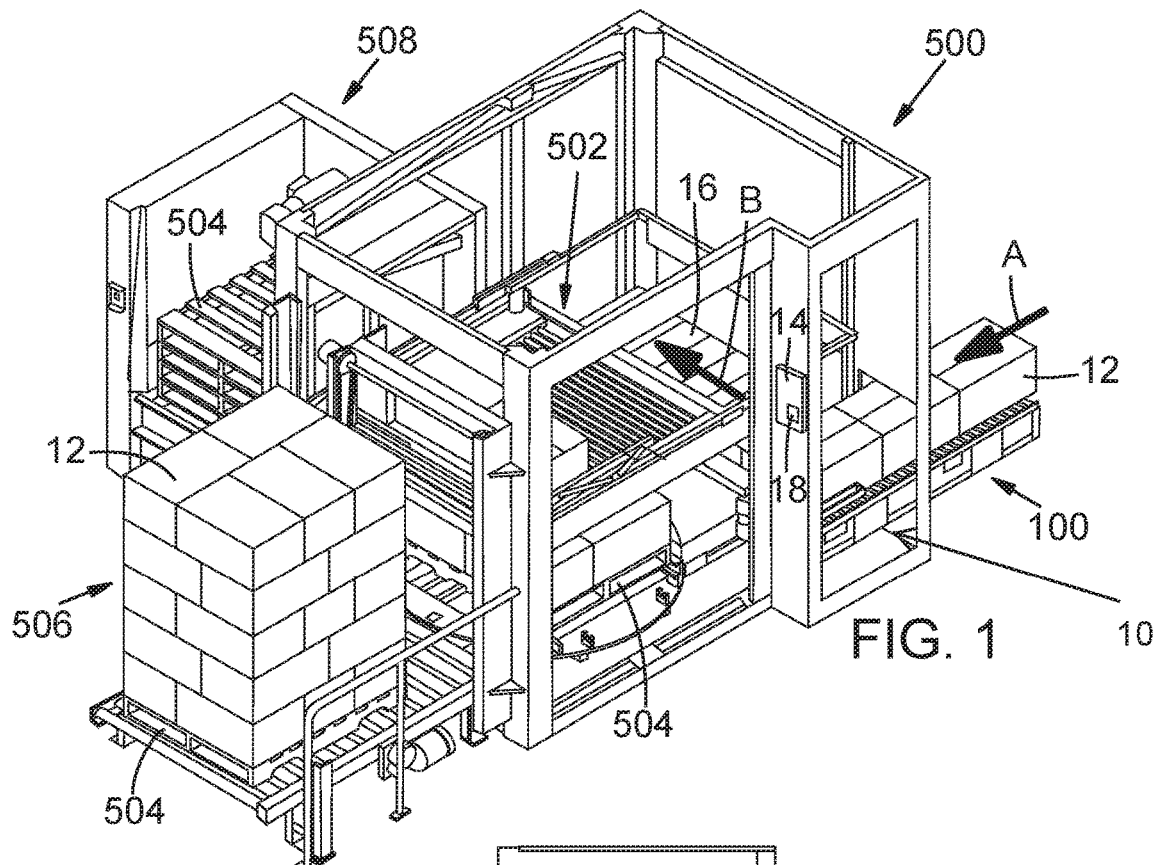
FIGS. 1 through 2 illustrate a complete palletizing system that includes a case manipulator according to the present invention. Specifically.
Figure 2:
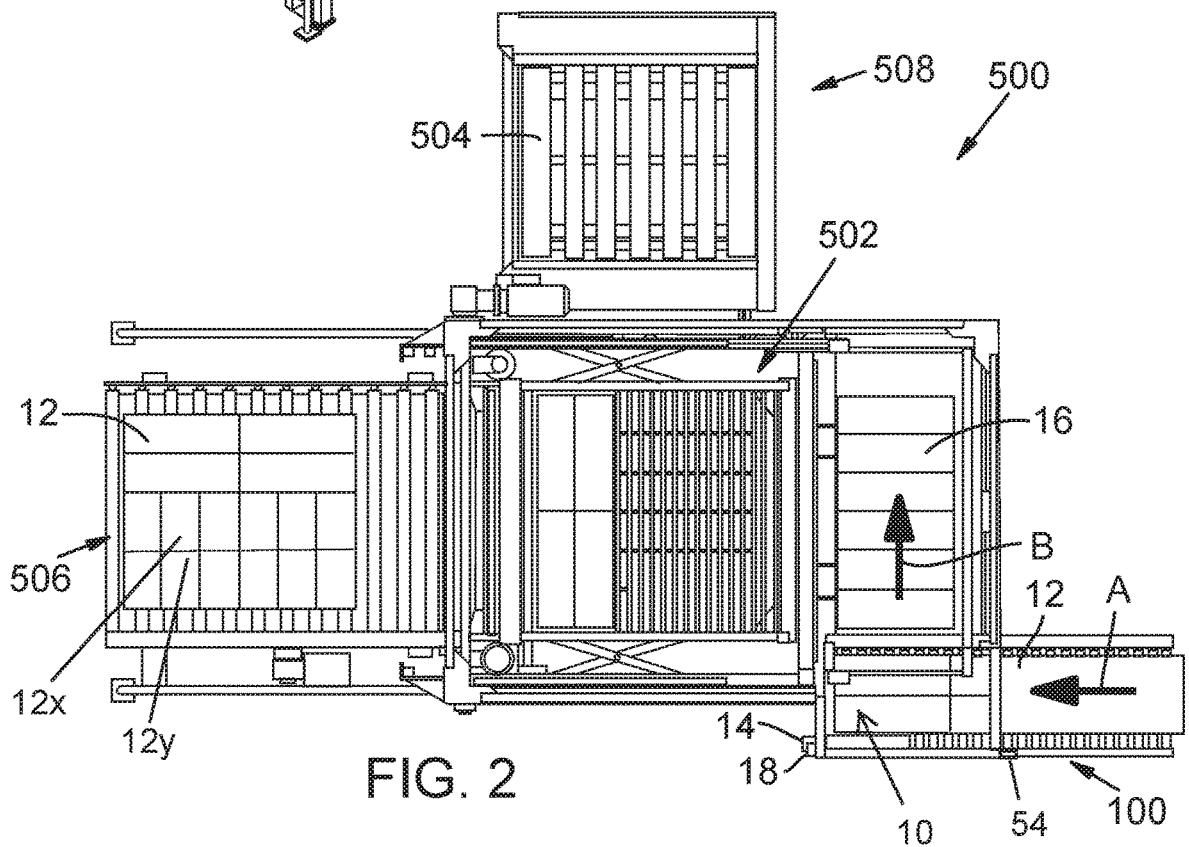

It is to be understood that the case manipulator 10 that is described in detail herein is used as a component of an entire palletizing apparatus that includes numerous additional systems, including for example a case infeed conveyer, a lift deck, a layer head a receiving deck and a stretch wrapping station. Some of these components are illustrated in FIGS. 1 and 2, and are described generally below in order to provide environment for the case manipulator 10. Versions of the components of palletizing systems with which case manipulator 10 may be used are described in detail in, for example, U.S. Pat. Nos. 7,736,120; 8,074,431; and 8,257,011, each of which is owned by the assignee of the present invention and the disclosures of which are incorporated herein by this reference.

With reference to FIGS. 1 and 2, and briefly described, the case manipulator 10 according to the present invention is incorporated into a palletizer system that is identified generally with reference number 500. Palletizer system 500 is designed for receiving product that is to be palletized, for example, cases 12 that are output from a production or manufacturing operation or from a repackaging operation. These so-called production feed areas are located "upstream" of the palletizer 500 in terms of product flow. Palletizer 500 includes, among other things, a product infeed conveyer 100 that delivers cases 12 from the upstream production feed area in the direction shown with arrow A. Cases 12 are moved from the infeed conveyer onto a row accumulator platform 16 with the case manipulator 10. Using the case manipulator 10 the cases are manipulated and oriented relative to one another in a desired orientation according to a build menu that is stored in a controller 14 and are transferred onto the accumulator platform 16 to form rows on the accumulator platform 16. In the embodiment of palletizer 500 shown in FIGS. 1 and 2, the case manipulator 10 operates on the cases 12 to form rows in the direction shown with arrow B, transverse to the direction of arrow A—that is, the cases are moved by the case manipulator in a direction that is perpendicular to the direction of case travel on the infeed conveyer. When a complete row of cases 12 has been formed on accumulator platform 16 by aligning the plural cases along the longitudinal axis of the platform 16, the platform is moved vertically so that the row of cases may be transferred to onto a layer head 502, which also may be reciprocated vertically to the desired level for transfer of the rows thereon. This row-building process continues until plural rows of cases 12 are transferred onto layer head 502 to thus form a complete layer of cases on the layer head. The layer head 502 is then moved vertically so that the complete layer is deposited onto a pallet 504, or the underlying next layer that has already been deposited onto the pallet. The layer head is configured for depositing the layers onto the pallet in known manners, such as by withdrawing the layer head from beneath the layer of cases. This process of building layers continues until a complete stack 506 of cases 12 has been formed. The stack of cases 506, including the pallet 504 (which may be supported on a turntable as part of the palletizer 500), is then moved out of the palletizer 500 to further processing such as stretch wrapping. It will be appreciated that the word "case" as used herein refers generically to items that may be manipulated on a palletizer 500, such as boxes, bags, bundles, trays and other things that may be palletized.

Palletizer 500 in FIGS. 1 and 2 includes a pallet delivery station 508 that delivers pallets 504 to the palletizer 500. It will be appreciated that there are numerous variations known in the art for making a palletizer 500 and that the apparatus described above is just one configuration of many with which the case manipulator 10 according to the present invention may be used.

Regardless of the specific types and orientations of components that are used in palletizer 500, each of the components is under the continuous control of a computerized processor or controller that is shown generally at 14. The controller 14 controls transport conveyers, a variety of motors, sensors and encoders that provide feedback and control information to the controller. Processor 14 is a conventional microprocessor with associated software and systems for complete operation of the palletizer. Among other things, processor 14 stores plural build menus 18—also referred to herein as "pattern build menus." As detailed below, each build menu 18 contemplates factors including case size, the configuration of cases in rows and orientation of the cases relative to one another, the configuration of rows in layers, and stack height. The build menu 18 thus ultimately defines the number and orientation of boxes in a row, the number and orientation of rows in a layer, and the arrangement and number of layers in a stack.

As another naming convention used herein, all cases shown in the drawings are identified with the reference number 12. When there is more than one case 12 shown in a drawing figure, the case that is furthest downstream in the flow of cases is assigned reference number 12a, the next adjacent upstream case is 12b, then the next upstream case is 12c, and so on. The leading edge of a case 12—that is, the side of the case that is the forward most side of the case considering the direction that the case is moving, is identified with a single "prime" symbol—for instance, 12'. The trailing edge of the same case is identified with a double "prime" symbol, for instance, the 12".

Figure 9:
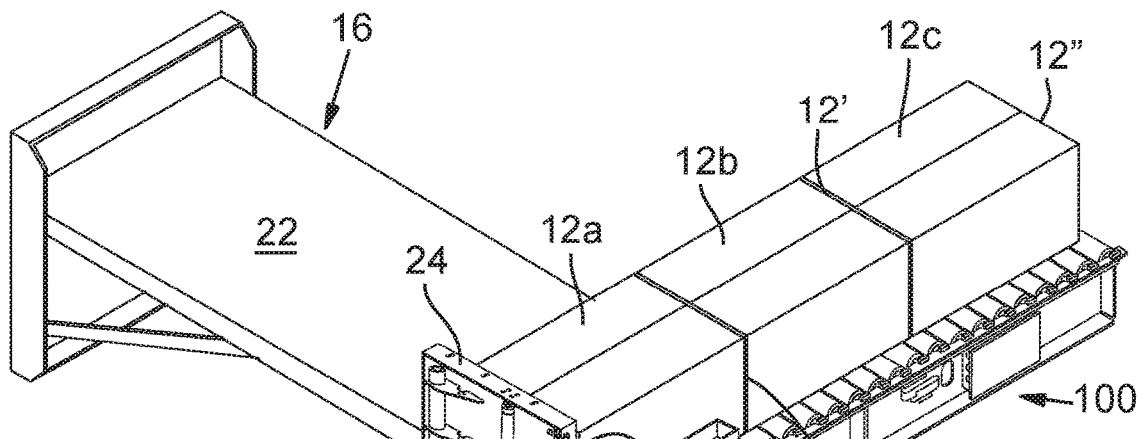
FIGS. 9 through 28 are a series of perspective illustrations showing operation of the case manipulator according to the present invention, and in which the other components of the palletizer have been omitted for the purpose of clarity. Specifically.

Continuing with the general description of palletizer 500, cases 12 are received from the production area and delivered to the infeed conveyer 100 where individual cases 12 are indexed there along for presentation to the next sequential system of the palletizer, the case manipulator 10. As may be appreciated and as is detailed below, cases 12 are oriented on infeed conveyer 100 in a particular orientation. With reference to FIG. 9, the cases 12 are rectangular and are oriented on infeed conveyer 100 such that the longest case dimension is parallel to the direction of movement of the cases along conveyer 100. The build menu 18 that is programmed into processor 14 includes data relating to case size, case orientation, row patterns and case orientation on the conveyer 100 and for the cases in each row, sequential row patterns that interfit to form layer patterns, and layer patterns that interrelate to ultimately produce a stable stack of boxes on a pallet. As shown in the figures and as readily recognized, cases 12 are not necessarily symmetrical in their length and width dimensions. For example, with standard rectangular boxes the length and width dimensions are not the equal. As such, individual boxes 12 in any given row and any row in a layer may need to be oriented according to the specific predefined build menu 18 that takes into account row-by-row variations within a layer, and layer-to-layer variations for adjacent layers on a stack of cases 12 deposited on a pallet. An assumption programmed into build menu 18 is that the individual cases 12 are delivered in a specific orientation on infeed conveyer 100. In the illustration of FIG. 9, for example, the cases are oriented such that the leading edge 12' is defined by the shorter width dimension, and thus that the trailing edge 12" is also the shorter width dimension of the case. Said another way, the longest dimension of case 12 is parallel to the direction of travel along conveyer 100. The conveyer 100 may optionally include one or more sensors such as electro optical sensor 54 that communicates with controller 14 and to detect the position of the leading and trailing edges of a case so that controller 14 can verify the correct orientation of the case on the conveyer. Thus, by detecting the leading edge 12' and the trailing edge 12" with sensors, the length of the case 12 between the edges may be determined. The dimensions of the case 12 are programmed into controller 14 and the controller may thus determine the orientation of the case on the conveyer (assuming that as shown in the figures the case is not square).

The structure of case manipulator 10 will now be described in detail with reference to FIGS. 3 through 8. But first, as shown in FIG. 9, it will be understood that case manipulator 10 is adapted to move cases 12 from the infeed conveyer 100 onto the row accumulator platform 16. When the infeed conveyer 100 delivers cases 12 in the direction shown in FIG. 9, the case manipulator 10 moves the cases in the transverse direction when placing the cases onto the accumulator platform 16. It will be understood that the infeed conveyer may just as well be oriented relative to the row accumulator platform that the cases 12 are delivered to the accumulator in a direction that is parallel to the direction that the manipulator moves the cases onto the accumulator.

A backstop plate 20 is located at the downstream limit of infeed conveyer 100 so that cases 12 stop when the leading edge 12' of a case abuts the backstop plate 20. The infeed conveyer is preferably a conventional roller conveyer, which may be either driven or non-driven. When a case 12 has its leading edge 12' abutting the backstop plate 20, the case is in a position that is ready to be acted upon by the case manipulator 10. Accumulator platform 16 defines a surface that, in a home position, is positioned adjacent to and at the same vertical level as the infeed conveyer 100 such that cases 12 on the infeed conveyer may be slid onto the accumulator platform by the case manipulator 10. As seen in FIG. 9, the accumulator platform 16 has defines a row build surface 22 onto which cases 12 are transferred from infeed conveyer 100. The row build surface 22 is preferably a solid surface on which the cases do not slide without active manipulation—in this way the cases remain where they are positioned on the surface 22 until they are intentionally moved. Surface 22 is thus a relatively high friction surface that acts as a dead plate across which cases 12 may be moved. However, once active pushing of a case has stopped the case will not continue movement across the surface 22. As noted previously, the row accumulator platform 16 is vertically movable so that the vertical position of the platform may be adjusted to, for example, transfer a complete row of cases that are positioned on the accumulator platform onto the layer head 502.

Figure 3:
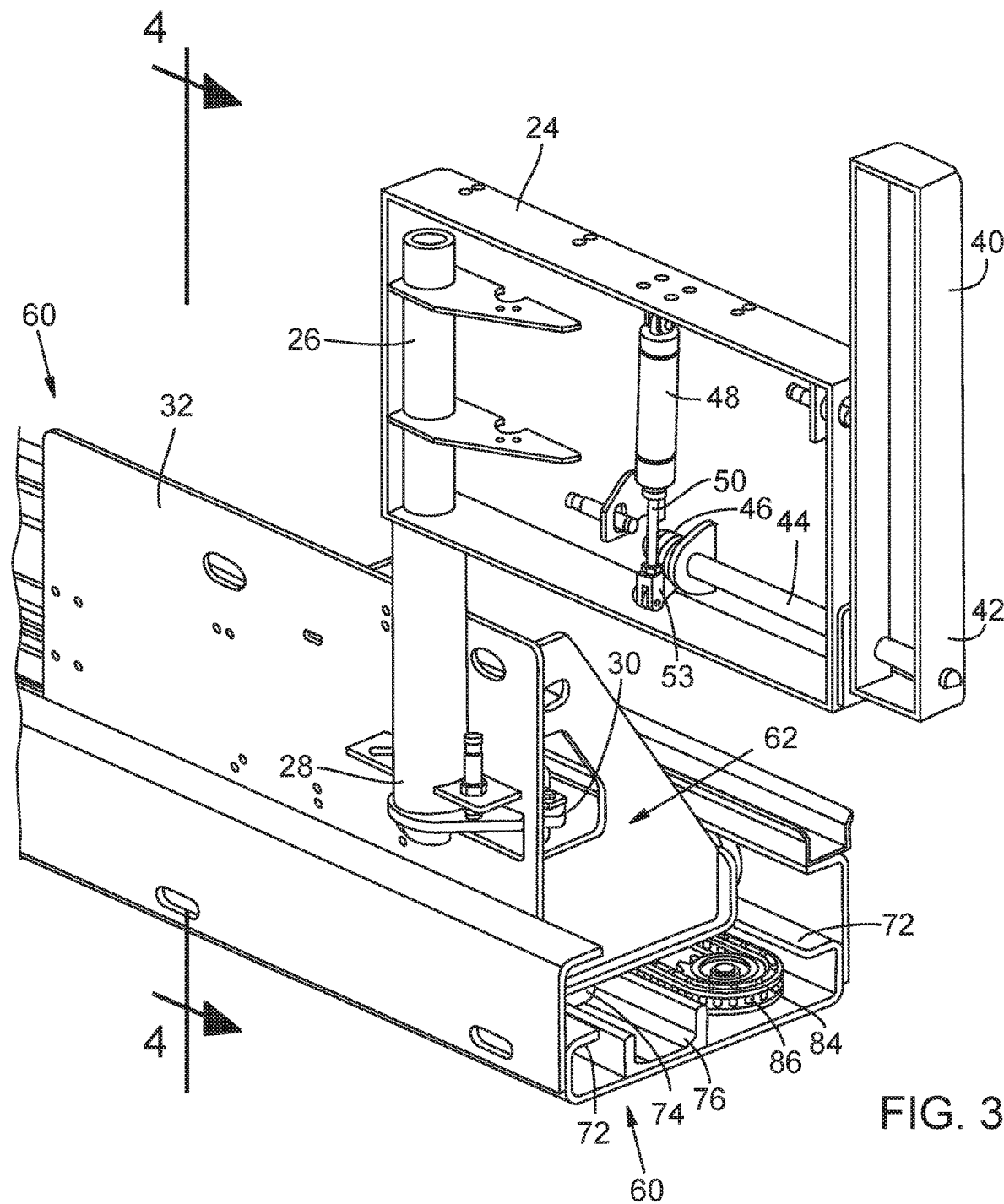
FIG. 3 is a perspective view of selected components of the case manipulator according to the present invention, illustrating the paddle in the upward position.
Figure 6:
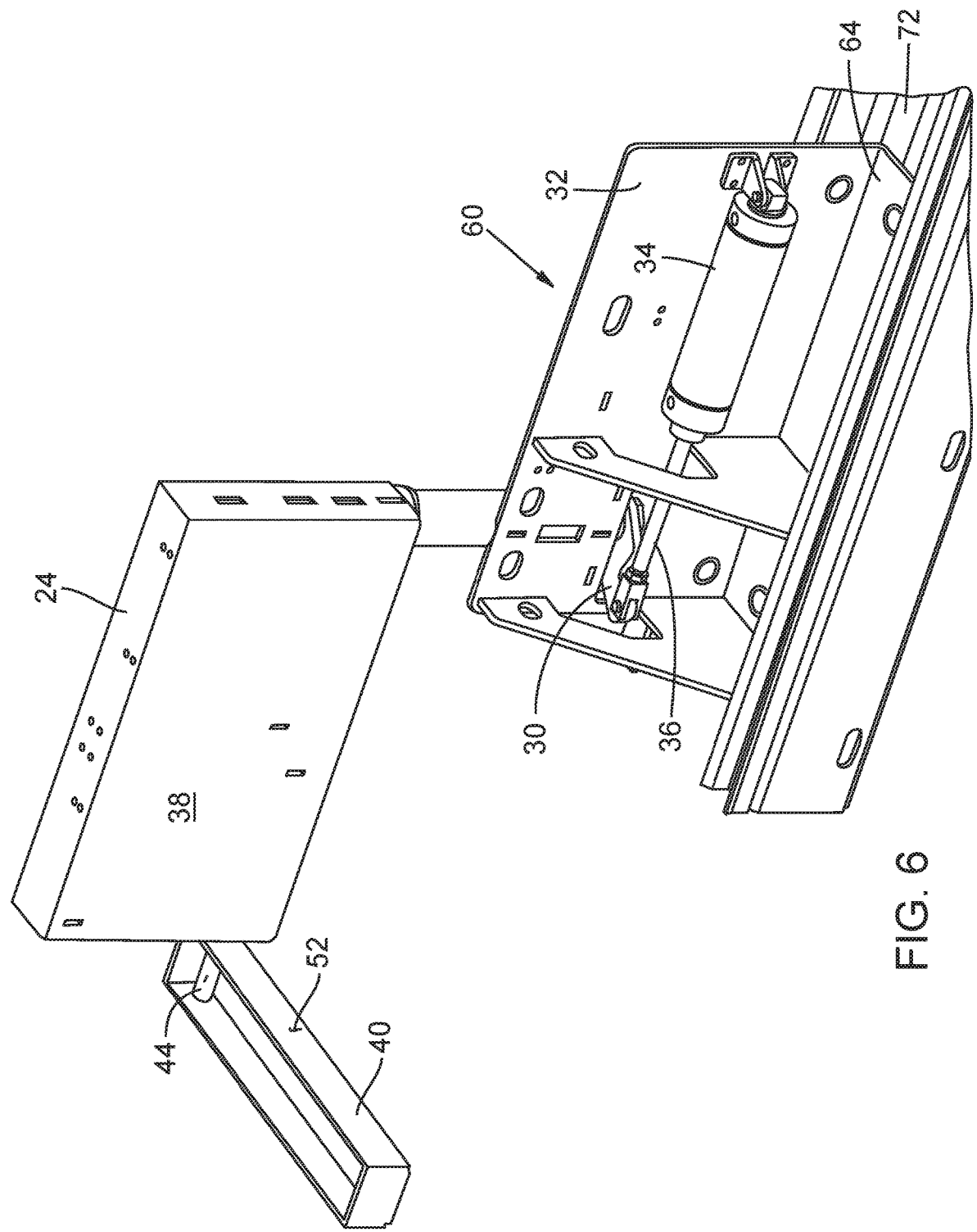
FIG. 6 is a perspective view of the case manipulator shown in FIG. 5 but illustrating the apparatus from the opposite side from the view of FIG. 5.
Figure 7:
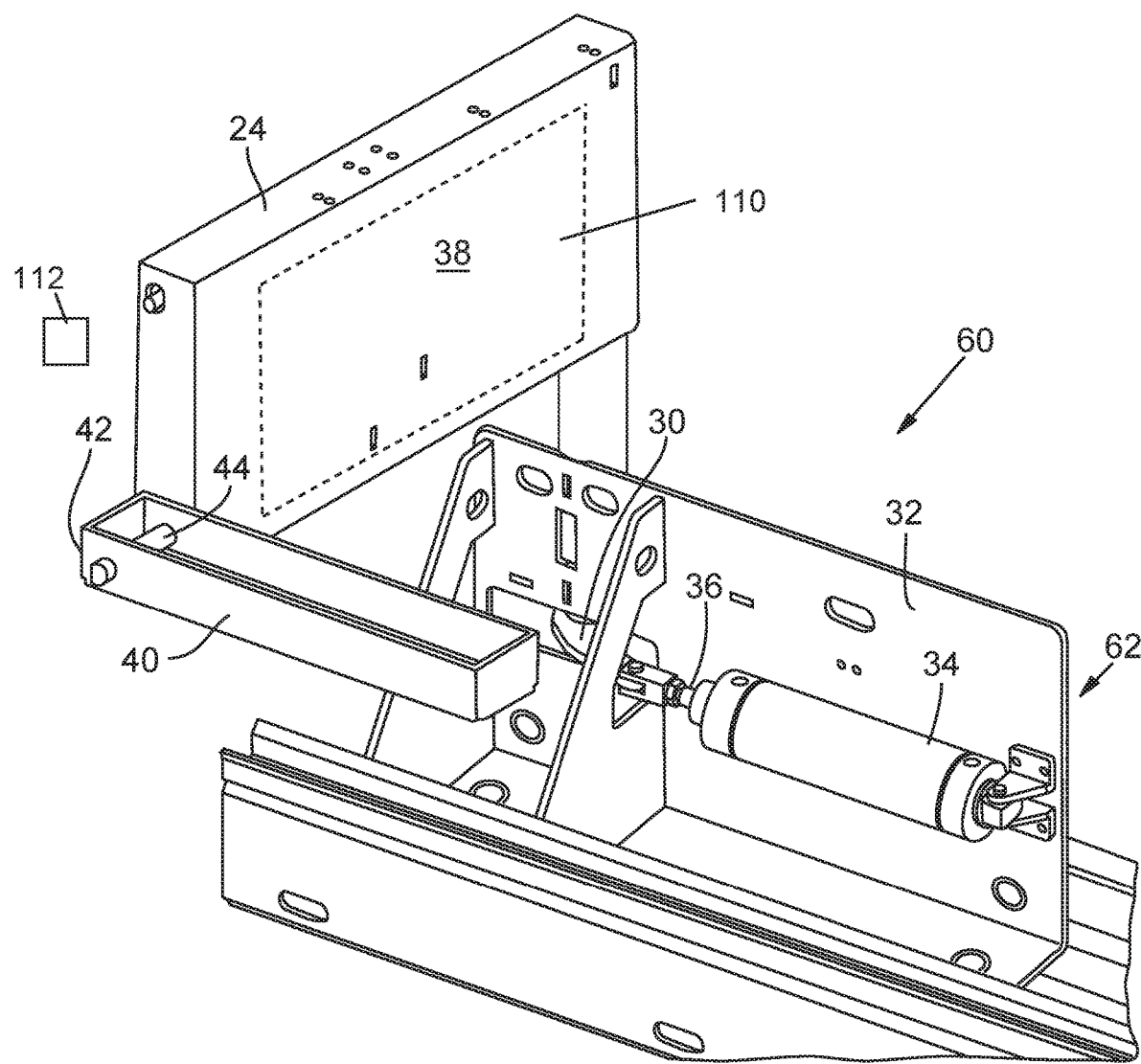
FIG. 7 is a perspective view of the case manipulator shown in FIG. 6 but showing the swing plate rotated 90 degrees relative to the position of the swing plate shown in FIG. 6.
Figure 8:
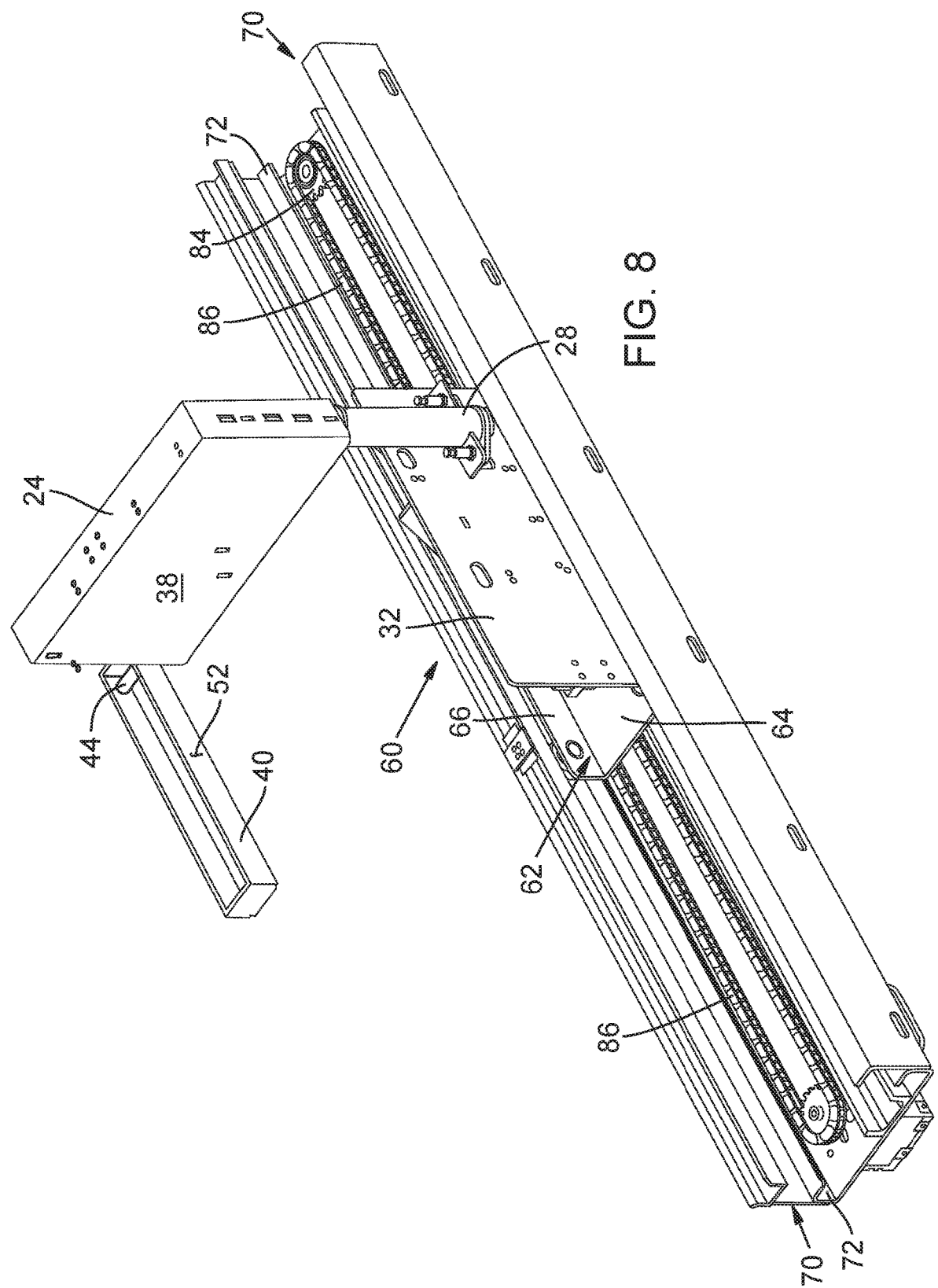
FIG. 8 is a perspective view showing the paddle and swing plate in the same positions as shown in FIG. 7 and also showing the manipulator carriage and track assembly.

Turning now to FIGS. 3 through 8, case manipulator 10 is defined by a swing plate 24 that is mounted to a vertically oriented shaft 26 that has its lower end 28 coupled to a linkage 30 that allows the shaft to be rotated by 90 degrees. The shaft 26 is mounted to a support plate 32 and is attached to the swing plate at the proximate edge of the plate. A pneumatic cylinder 34 is mounted to support plate 32 as shown in FIG. 6 and the output shaft 36 has its distal end attached to linkage 30 so that reciprocal movement of the output shaft 36 under the control of controller 14 causes 90 degree pivoting movement of the swing plate 24 about shaft 26. The position of swing plate 24 shown in FIG. 3 is sometimes referred to herein as the "home" position or the "first position." The position of swing plate 24 that is shown in FIGS. 7 and 8 is the "pivoted" position, or the "second" position. In the pivoted position the swing plate 24 has been rotated about the vertically oriented shaft 26 by 90 degrees by action of the pneumatic cylinder 34. As detailed below, the swing plate 24 defines a case pushing/manipulating, major surface 38 that abuts cases 12 and both pushes the cases and orients them in desired manners. The major surface may be covered with a foam pad if desired, for instance, to minimize abrasion to cases arising out of the contact between the swing plate and a case.

A paddle arm 40 is pivotally mounted at its lower end 42 to a horizontally oriented shaft 44 that is mounted to the distal or outboard edge of swing plate 24—the shaft 44 is mounted to the swing plate near the lower and outer edge of the plate as shown in FIG. 3. A linkage 46 that allows the shaft 44 to be rotated by 90 degrees is mounted to swing plate 24 and a pneumatic cylinder 48 is mounted to swing plate 24 as shown in FIG. 3 and the output shaft 50 has its distal end 52 attached to linkage 46 so that reciprocal movement of the output shaft 50 under the control of controller 14 causes 90 degree pivoting movement of the paddle arm 40 about shaft 44. The position of paddle arm 40 shown in FIG. 3 is sometimes referred to herein as the "home" position or the "first position." The position of paddle arm 40 that is shown in FIGS. 7 and 8 is the "pivoted" position, or the "second" position. In the pivoted position the paddle arm 40 has been rotated about the shaft 44 by 90 degrees by action of the pneumatic cylinder 48. As detailed below, the paddle arm 40 defines a case pushing/manipulating surface 52 that abuts cases 12 and both pushes the cases and orients the cases in desired manners.

It will be appreciated by those of skill in the art that the shafts 26 and 44 that mount the swing plate 24 and paddle arm 40, respectively, define pivot points for the swing plate and the paddle arm, and that there are many known mechanisms other than shafts for defining such pivot points.

The swing plate 24 and the paddle arm 40 that is attached to it are mounted to a carriage assembly 60 that allows the swing plate and paddle arm to be reciprocally moved and shuttled along the longitudinal axis defined by the row accumulator platform 16 to thereby move cases on the platform.

Figure 4:
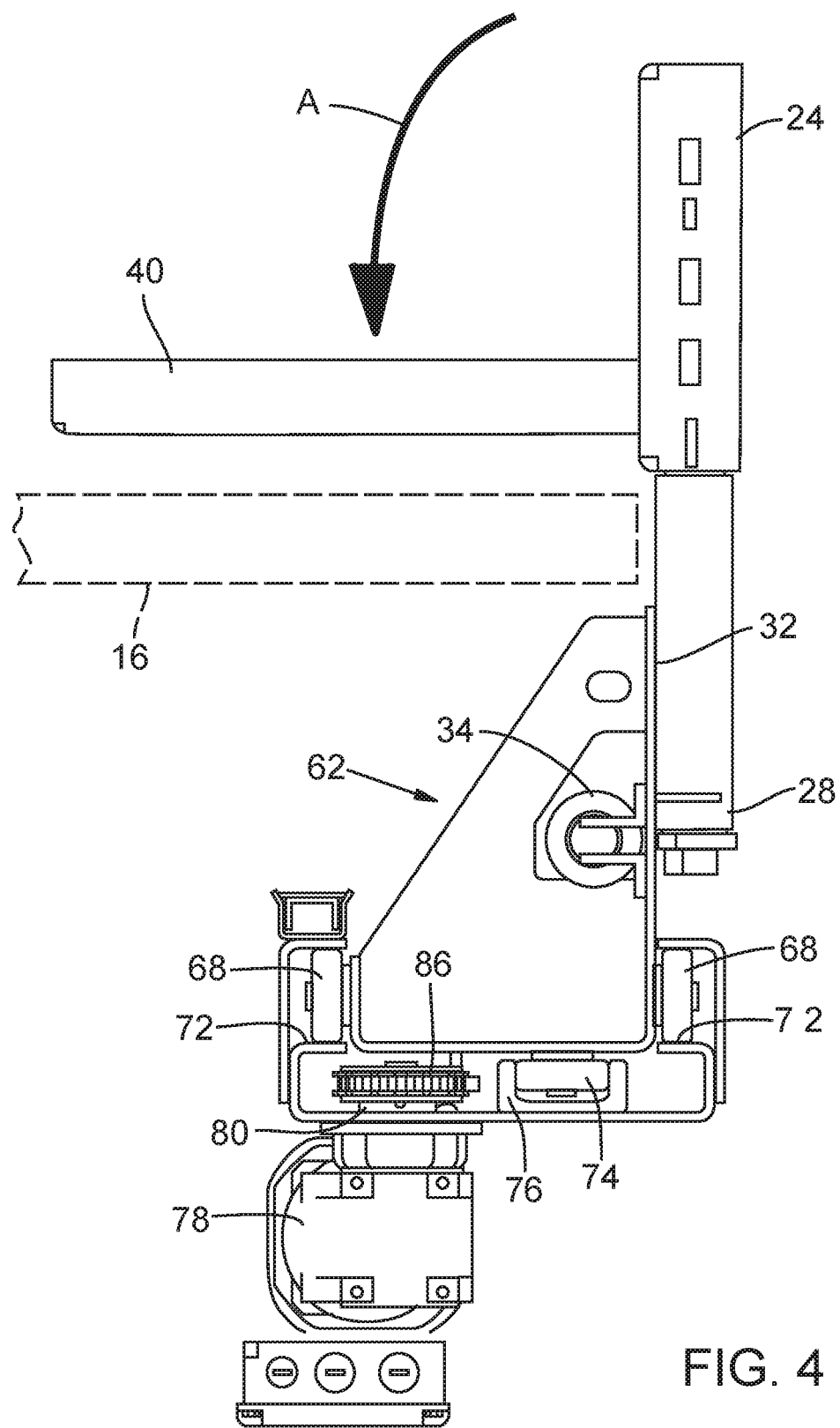
FIG. 4 is an end elevation view of the case manipulator shown in FIG. 3, illustrating the paddle in the upward position in solid lines and in the downward position in phantom lines.
Figure 5:
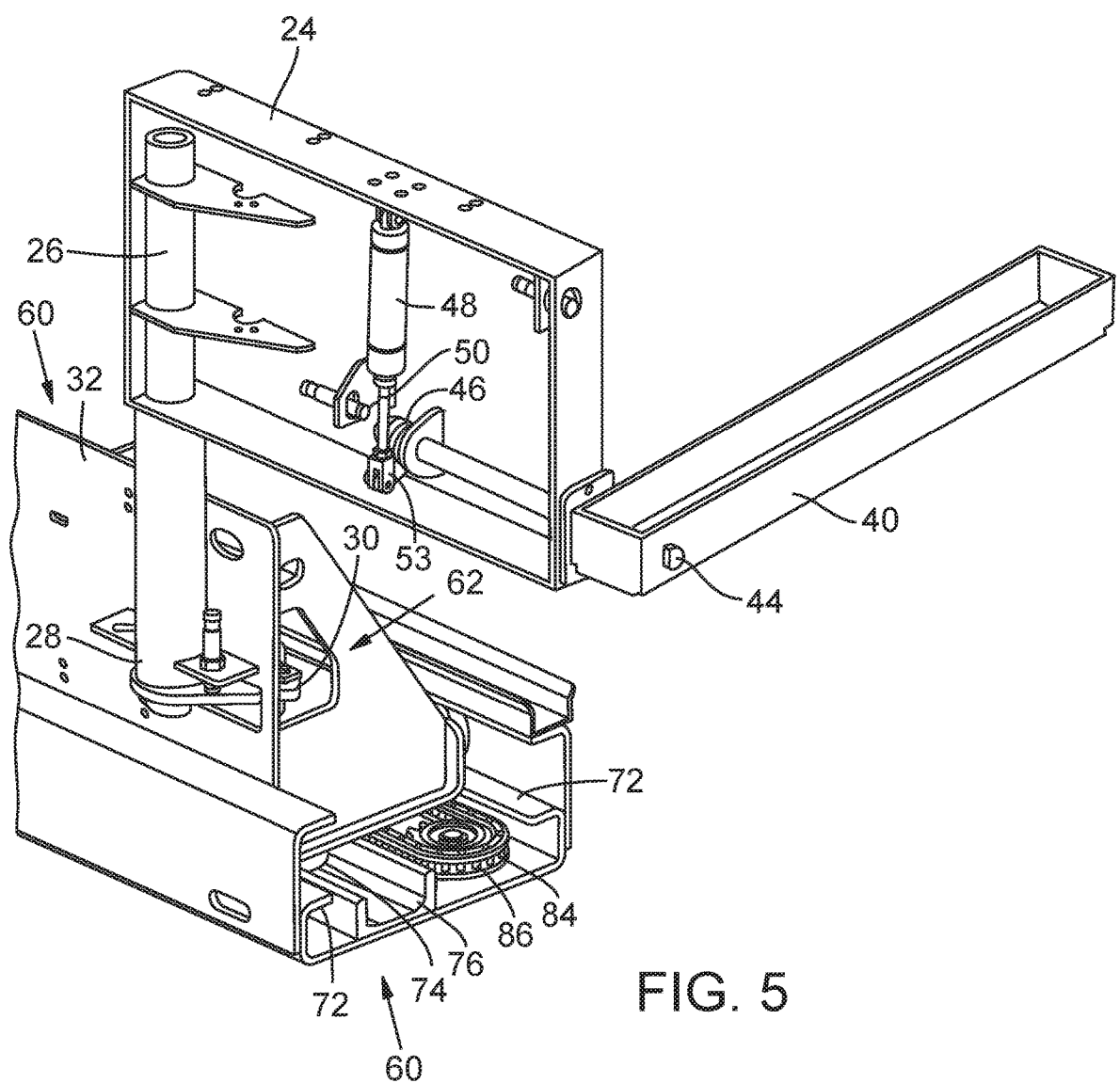
FIG. 5 is a perspective view of selected components of the case manipulator according to the present invention as shown in FIG. 3 but illustrating the paddle in the downward position.

Carriage assembly 60 is defined by a trolley 62, of which support plate 32 is one component, and which includes a bottom plate 64 and a side plate 66 opposite support plate 32. Four wheels 68 are mounted to trolley 62—two wheels 68 mounted to support plate 32 and two wheels 68 mounted oppositely to side plate 66. The trolley 62 is mounted in a track assembly 70 such that wheels 68 ride on rails 72. A pair of guide wheels 74 (only one of which is shown in FIG. 4) are received in a guide channel 76 so that the reciprocal movement of trolley 62 remains linear at all times.

Movement of trolley 62 is accomplished with a motor 78 that has its output shaft 80 attached to a driven first sprocket 82 at one end of the carriage assembly 60. A second idler sprocket 84 is mounted at the opposite end of the carriage assembly. A chain 86 has its opposite ends connected to trolley 62 and extends around the first and second sprockets 82 and 84 as best seen in FIG. 8. Rotation of output shaft 80 of motor 78 causes rotation of driven sprocket 82 and thus movement of chain 86, and the attached trolley 62. Motor 78 is preferably an encoder feedback motor that is under the control of controller 14. And controller 14 includes encoder algorithms that correlate with encoder feedback from motor 78 so that the precise location of swing plate 24, and thus of a case 12 is known. Accordingly, the position of trolley 62 and thus swing plate 24 and paddle arm 40 are at all times recognized by controller 14.

Operation of case manipulator 10 according to the present invention will now be explained in detail with reference to the series of figures of FIGS. 9 through 25 in which the infeed conveyer 100, the row accumulator platform 16 and the case manipulator 10 are shown in isolation without the other components of palletizer 500. The arrows in FIGS. 9 through 25 show generally the direction of movement of various components during operation of the apparatus, as detailed below. It must be pointed out that in the embodiment and configuration shown in the figures, cases are delivered to the row accumulator 16 on an infeed conveyer 100 that is oriented so that the flow of cases is perpendicular to the row accumulator. As noted previously, the infeed system may just as well be oriented so that cases are delivered in a product flow that is parallel to the orientation of the row accumulator.

Further, and as detailed below, row accumulator 16 illustrated herein is adapted for vertical reciprocal movement to shuttle a row of cases assembled thereon to the next processing component. For instance, when a complete row of cases 12 has been positioned and assembled on row accumulator platform 16 in the desired orientation according to the build menu, the row accumulator platform described herein is moved vertically so that the row of cases may be transferred as a row from the row accumulator platform to, for example, the layer head 502. The transfer of cases to layer head 502 may be accomplished with a variety of different mechanism, including pusher bars, puller bars, pick and place clamp bars, and the like, as known to those of skill in the art. Given that the row accumulator platform 16 is adapted for vertical reciprocal movement, it will be understood that the case manipulator 10 described herein is positioned adjacent the row accumulator (and the infeed conveyer 100) such that the case manipulator is capable of manipulating cases 12 that are positioned on the row accumulator 16 and the infeed conveyer 100 but such that the components do not interfere with one another. The row of cases 12 may be further conditioned as appropriate on with compaction bars and the like if appropriate.

In the preferred embodiment, cases 12 are delivered on infeed conveyer 100 in a known and pre-determined orientation—the orientation of the cases on infeed conveyer 100 is programmed into controller 14. In addition, case orientation may also be determined and/or confirmed with sensors such as sensor 54 on the infeed conveyer. In this later case, with the case size information stored in the controller 15 at build menu 18, the dimension of the case 12 passing by the sensors on the infeed conveyer 100 is known and therefore the orientation of case 12 is known. If a rectangular case such as those shown in FIG. 9 is conveyed past a pair of sensors such that the long side of the box is parallel to the direction of infeed conveyer travel, and the relatively shorter side of the box is transverse to the direction of travel, the sensors will detect a box length. In other words, if the box is situated on the infeed conveyer 100 so that the leading edge 12' first trips a sensor beam and the trailing edge 12" the controller 14 recognizes box length data and is able to determine that the box is in a given orientation. Of course, if a case is square the orientation of the box on the infeed conveyer 100 is irrelevant.

A complete stack 506 of cases has plural rows and layers of cases and the number and relative orientations of cases within a row and within a layer will vary depending upon the size and shape of the case. Spacing between adjacent cases also may vary. When the cases are non-square such as cases 12 shown herein such that the length of the case is greater than the width, some of the cases are required to be oriented at 90 degrees relative to other cases. The build menu 18 includes data that informs the required relative positioning of all cases in a stack based on the desired complete stack information. Controller 14 thus controls operation of palletizer 500 to build a complete stack 506 according to the build menu for the particular cases 12 that are being stacked.

With specific reference now to FIG. 9 the row accumulator platform 16 is positioned such that row build surface 22 is at the same level as the level of infeed conveyer 100—this facilitates smooth transfer of cases 12 from the infeed conveyer onto the row accumulator platform 16. In FIG. 9, the swing plate 24 is in the home position and the paddle arm 40 is shown in the pivoted position. When the swing plate 24 is in the home position the surface 38 of the swing plate acts as a stop for cases 12 that are being delivered on the infeed conveyer 100 in the direction of the arrow on the cases. When both swing plate 24 and paddle arm 40 are in their respective home positions they are spaced apart and separated from the adjacent edge of the row accumulator platform 16; the surface 38 and the analogous surface of the paddle arm are coplanar and in a plane that is spaced from the edge of the row accumulator platform. As detailed below, this allows the row accumulator platform to be moved vertically to transfer assembled rows of cases without interference from the swing plate and paddle arm. In FIG. 9 there are three cases, 12*a*, 12*b* and 12*c* lined up on the infeed conveyer 100. With case manipulator 10 in the home position of FIG. 9, the paddle arm 40 is free to move from its home position to its pivoted position as shown by the arrow in FIG. 9. In this second, pivoted position, the paddle arm lies adjacent a side of case 12*a*.

Figure 10:
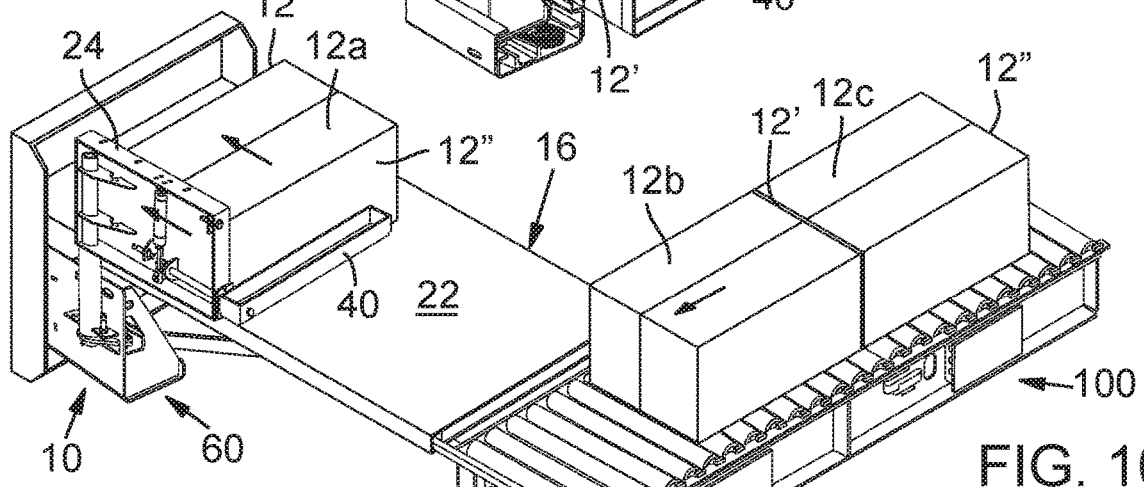

In FIG. 10 the case 12*a* has been moved onto row accumulator platform 16 by the case manipulator 10. Specifically, under the control of controller 14 operating motor 78, the trolley 62 has been shuttled in the direction of the arrow on case 12*a*—to the left in the view of FIG. 10. Because paddle arm 40 is in the second position and is engaging the side of case 12*a*, the case is pushed by the paddle arm along the surface 22 of the row accumulator as trolley 62 is shuttled—the vertical position of row accumulator 16 is such that the paddle arm 40 travels over the accumulator. The case 12*a* is pushed on row accumulator platform 16 with paddle arm 40 until the case is positioned on the accumulator platform 16 to a pre-determined position according to the particular build menu 18 that is being used. In the instance of FIG. 10, the case 12*a* has been moved completely across the row accumulator platform 16 at near its terminal or distal end. As noted previously, motor 78 is an encoder feedback motor under the control of controller 14. The encoder feedback function allows the controller to recognize the position of swing plate 24 along its travel path. Said another way, the position of the swing plate 24 is electronically evaluated throughout its travel path so that when the trailing edge 12" of a case is in the desired location on accumulator platform 16 according to the build menu 18, the controller determines that the case is properly positioned and case manipulator 10 motion is stopped.

Figure 11:
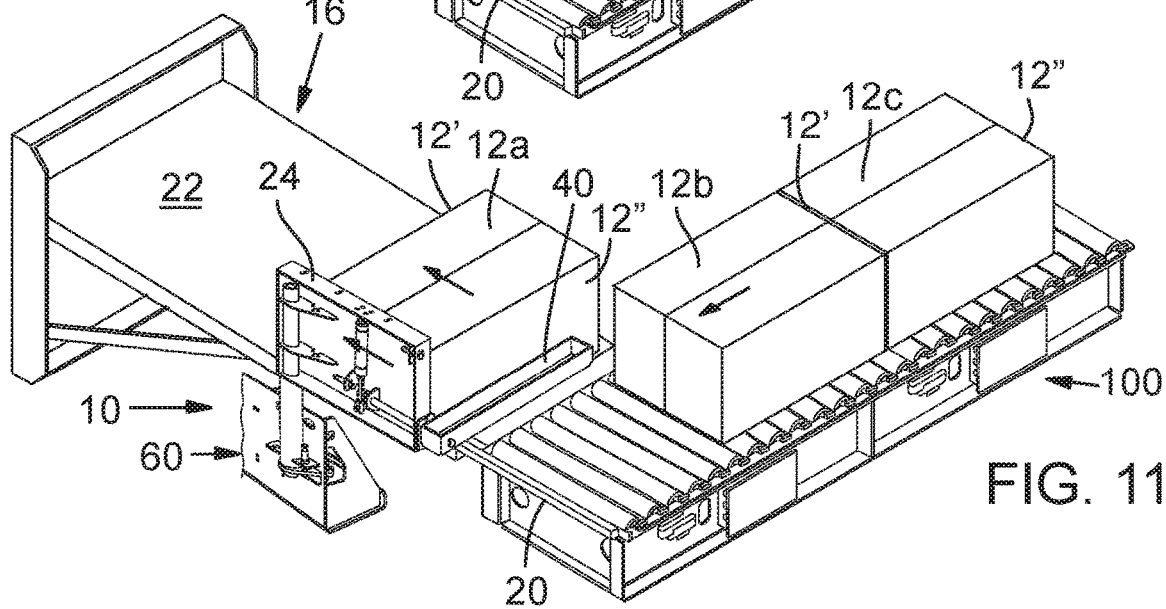

FIG. 11 shows an alternative positioning for case 12*a* on the row accumulator platform 16. Specifically, dictated by the build menu 18, in FIG. 11 the case 12*a* has been positioned near the proximate end of the row accumulator platform 16.

Figure 12:
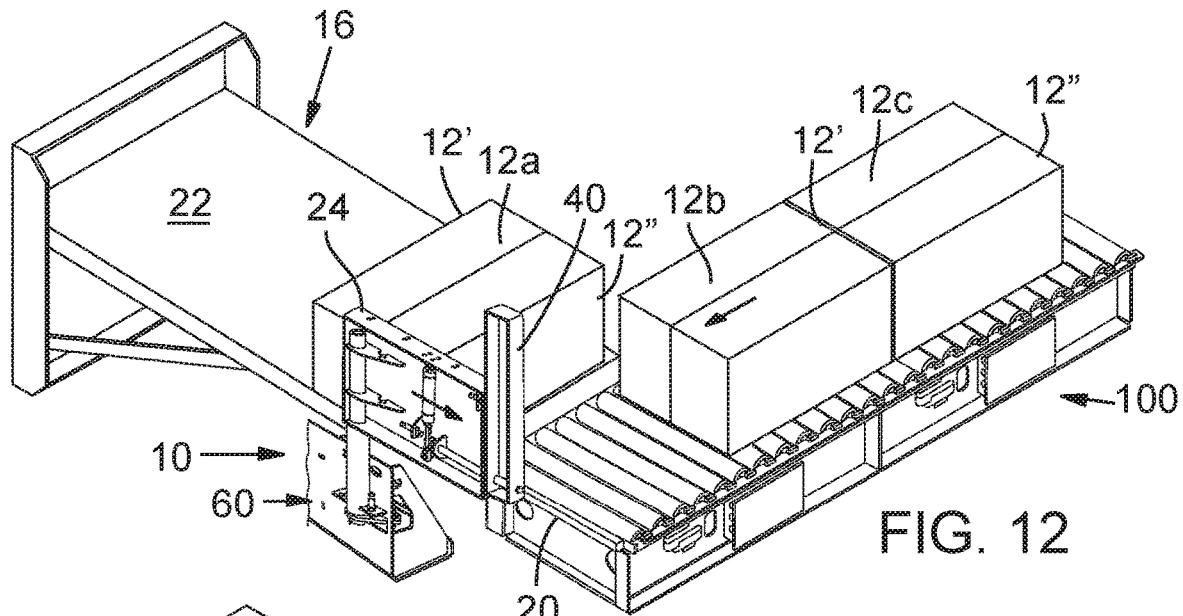
Figure 13:
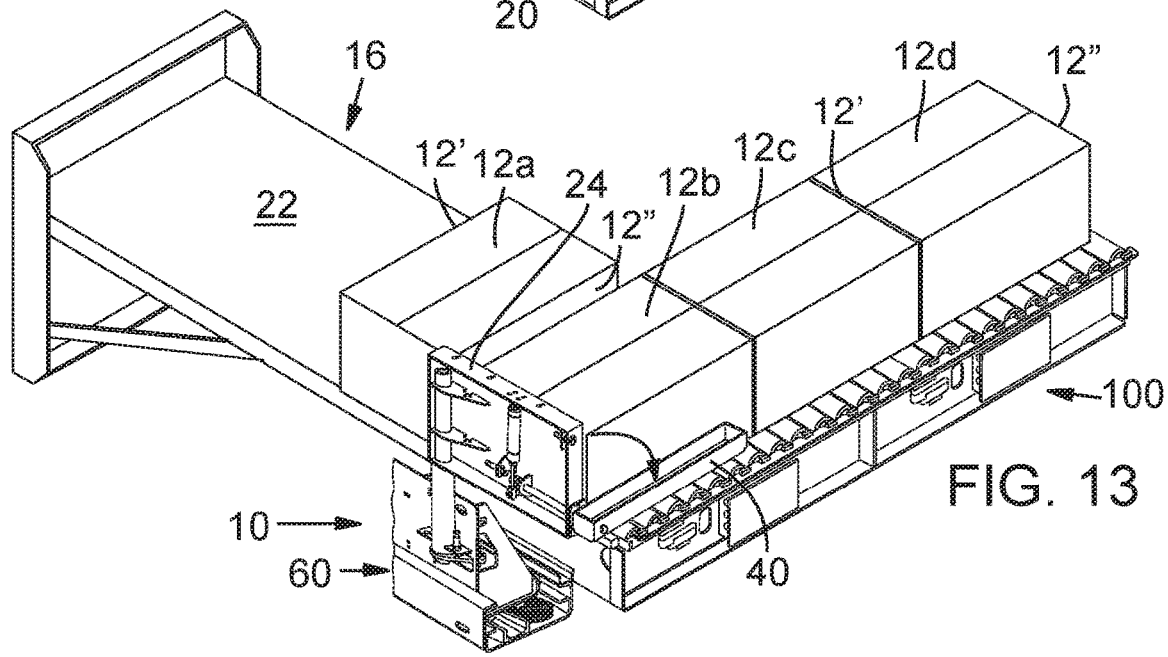

Once a case 12 has been positioned on row accumulator platform 16 in the pre-determined position called for by build menu 18, paddle arm 40 is pivoted from the second position to the home position. This is shown in FIG. 12. Simultaneously, case 12*b* is transported on infeed conveyer 100 toward the location where the case 12*b* may be moved onto the row accumulator platform with the case manipulator 10. It will be appreciated that with the swing plate 24 and paddle arm 40 both in the home position of FIG. 12, the case manipulator may be moved back to its home position as shown in FIG. 13 and the paddle arm 40 will not interfere with the case 12*b* as the swing plate 24 and the paddle arm 40 move past the leading edge 12' of case 12*b*. This positioning with both the swing plate 24 and paddle arm 40 in their home positions, and with the trolley 62 positioned such that the paddle arm 40 may operate on another case on infeed conveyer 100, the case manipulator 10 is in its home position. In FIG. 13, the controller 14 has moved paddle arm 40 into the pivoted, or second position (as shown by the arrow) so that it is adjacent to the side of case 12*b* and the case manipulator 10 is ready to move case 12*b*.

Figure 14:
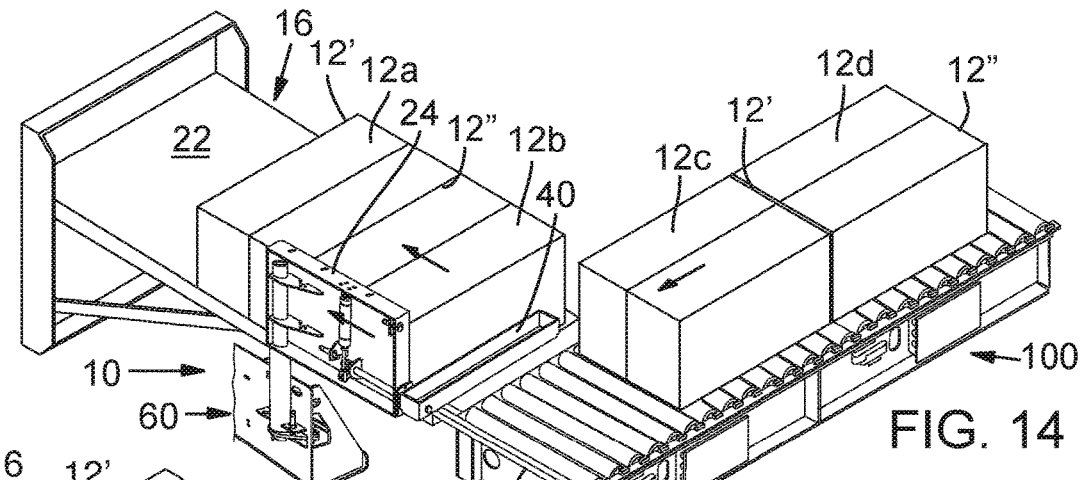

In FIG. 14, case 12*b* has been transported from the infeed conveyer 100 by the pushing action of paddle arm 40 and onto row accumulator platform 16. As the case 12*b* is pushed onto the row accumulator platform, the leading edge 12' of case 12*b* abuts the trailing edge 12" of adjacent case 12*a*. As such, both cases 12*a* and 12*b* are pushed along the row accumulator platform to the pre-determined and desired location.

Figure 15:
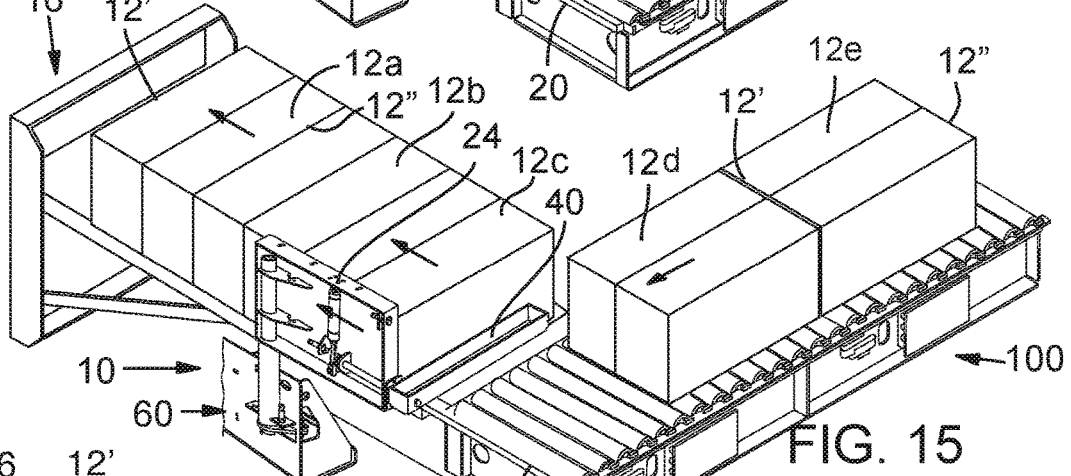
Figure 16:
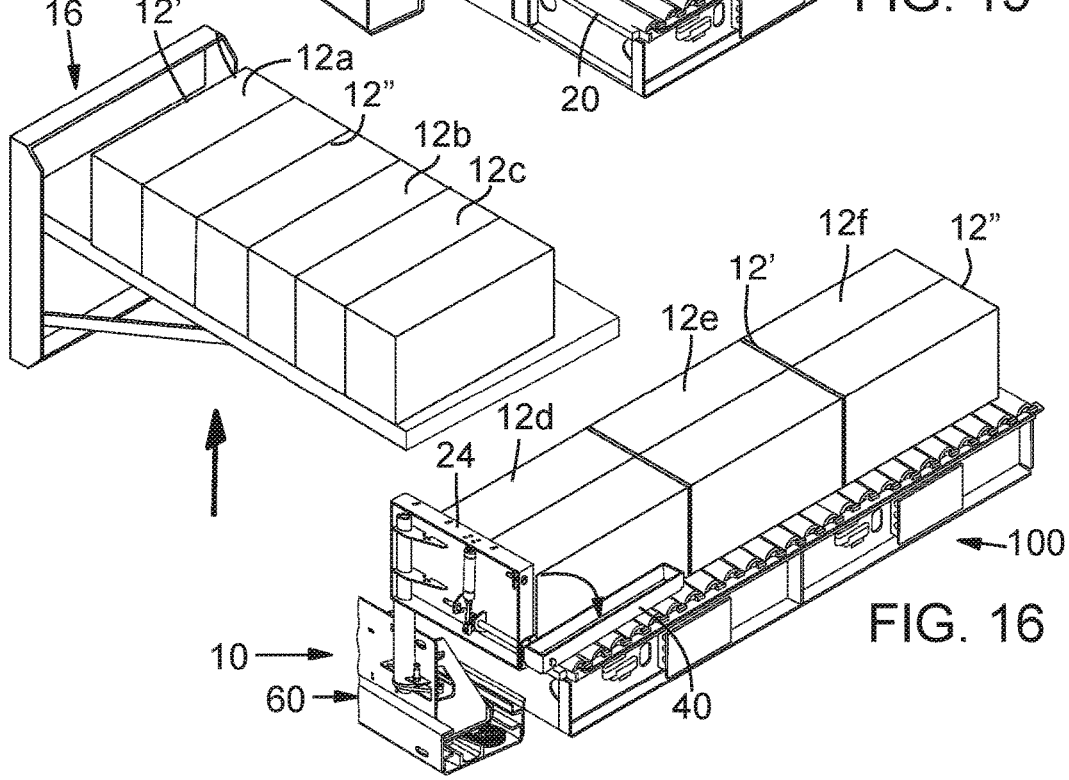
Figure 18:
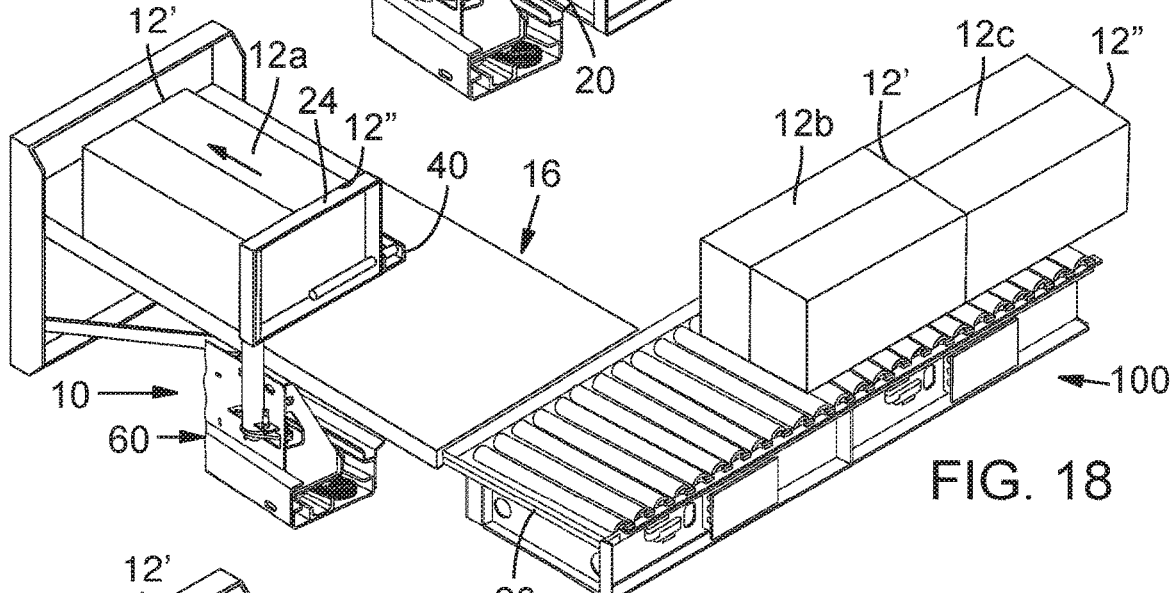

FIG. 15 continues the sequence of figures from FIGS. 13 and 14. The build menu 18 utilized for the arrangement of cases 12*a*, 12*b* and 12*c* shown in FIG. 15 calls for the three cases to be arranged side by side as shown in FIG. 18. Thus, in FIG. 15 the third case 12*c* has been pushed onto the row accumulator platform with the pushing action of paddle arm 40 so that the three cases are arranged in a row. At this time, paddle arm 40 is pivoted to its home position. Once paddle arm 40 is in the home position, and with swing plate 24 in its home position, row accumulator platform 16 with the row of cases defined by side by side cases 12*a*, 12*b* and 12*c*, is moved vertically as shown by the arrow in FIG. 16 so that the row may be transferred to layer head 502 as described above. As noted above, when the swing plate and paddle arm are in their home positions they are spaced from the adjacent edge of the row accumulator platform. Because the swing plate and paddle arm are both in their home positions and separated from the edge of the row accumulator platform, the row accumulator platform is thus free to move vertically past the swing plate and paddle arm without interference and without regard to the position of the trolley 62 relative to the row accumulator. Said another way, regardless of the position of the trolley, the row accumulator is capable of moving vertically past the swing plate and the paddle arm so long as both are in their home positions. Simultaneously, or as quickly as possible after the row of cases has been assembled on the row accumulator, the trolley 62 is shuttled to its home position—in the direction to the right in FIG. 16—so that the paddle arm may be pivoted into the second position, ready to act on the next case 12 that has been delivered to the end of the infeed conveyer 100 to begin building the next row. Some build patterns 18 may call for a single case located at the furthest end of the row accumulator; the capability to move the row accumulator vertically (or alternately, to use a pick and place engagement of the cases) prior to the full return of the trolley to its home position increases efficiency.

FIGS. 17 through 25 continue with illustrations of sequential operation of case manipulator 10, but these figures show a second case 12 positioning capability of the case manipulator over the pushing functions shown in FIGS. 9 through 16; namely, rotation of the case. Thus, when the build menu 18 calls for a case 12 to be rotated the controller 14 causes swing plate 24, in combination with paddle arm 40, to rotate the case.

It will be appreciated that when cases 12 are transferred from infeed conveyer 100 onto row accumulator platform 16 as shown in FIGS. 9 through 16, it is the paddle arm 40 that is the component of case manipulator 10 that defines the pushing member. However, when a case is rotated by case manipulator 10 as described below and as shown in FIGS. 17 through 25, it is the swing plate 24 that is the component of case manipulator 10 that defines the pushing member. The axis of pivotal rotation of swing plate 24 on vertical shaft 26 is perpendicular to the axis of pivotal rotation of paddle arm 40 on shaft 44. This relationship allows both the paddle arm 40 and the swing plate 24 to be the pushing member depending on the positioning of the paddle arm and the swing plate.

Figure 17:
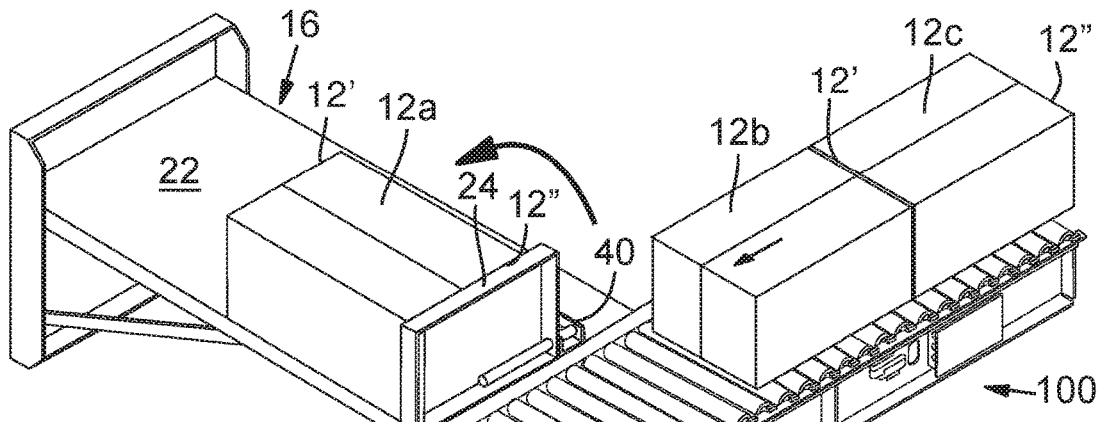

Beginning with FIG. 17 it may be seen that paddle arm 40 is in the second position and that swing plate 24 also has been pivoted into the pivoted, second position where the swing plate. When a case 12 is to be rotated as shown in FIG. 17, the case is initially engaged by case manipulator 10 in the position shown in, for example, FIG. 9, with paddle arm 40 in the second position to engage the side of the case. However, rather than the case manipulator 10 pushing the case 12 laterally onto the row accumulation platform 16 as shown in FIG. 10, the swing plate 24 is pivoted by rotation of shaft 28 as shown with the arrow in FIG. 17. The paddle arm 40 is abutting the side edge of case 12 and as swing plate 24 pivots from the home position to the second position the paddle arm 40 essentially captures the case between the paddle arm and the swing plate so that the case rotates about a vertical axis, perpendicular to the ground plane. The swing plate 24 rotates 90 degrees so that the case 12 is rotated 90 degrees. When this happens, the leading edge 12' of case 12*a* is reversed. In other words, the leading edge 12' of case 12*a* prior to its rotation by case manipulator 10 was the leading edge when the case was on the infeed conveyer, as detailed in, for example, FIG. 9. However, after rotation that former leading edge 12' has now become the trailing edge 12" by virtue of the new orientation of the case on the accumulator platform 16.

Figure 19:
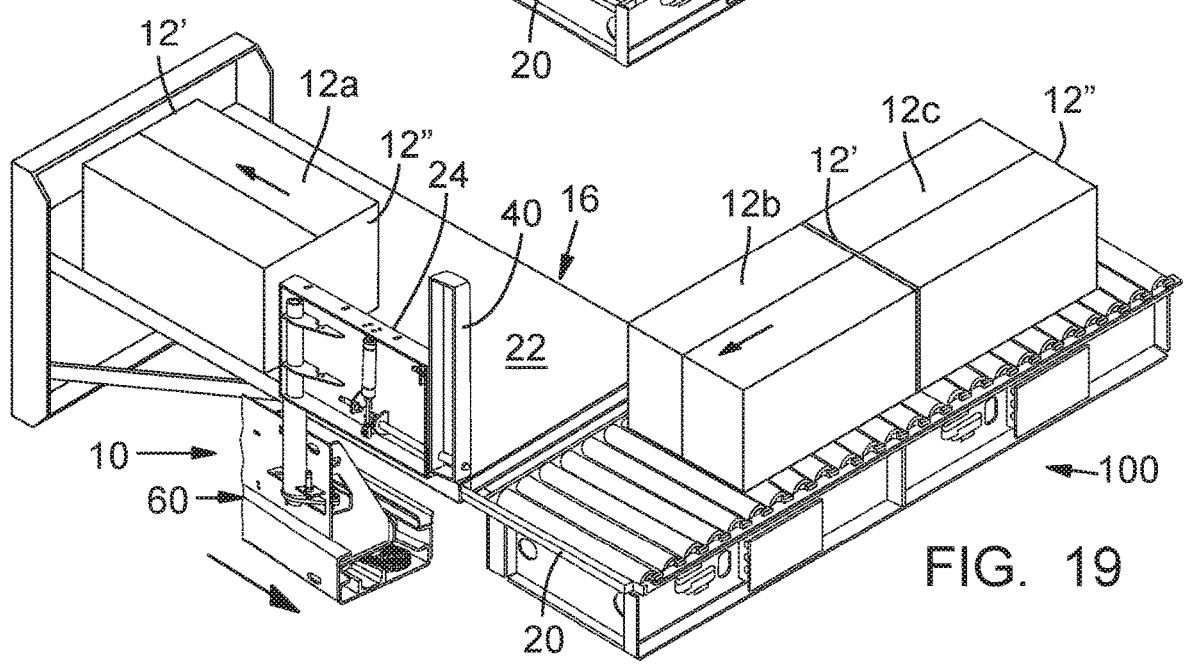
Figure 20:
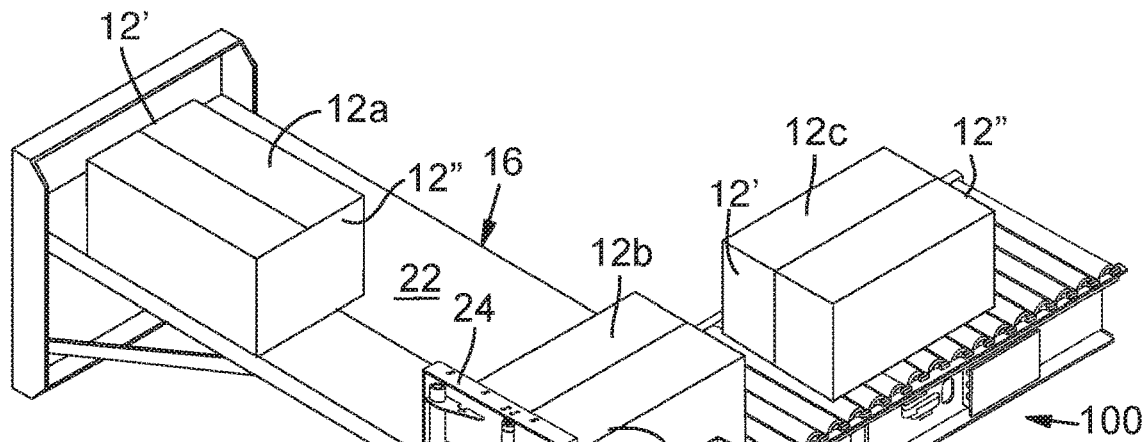
Figure 21:
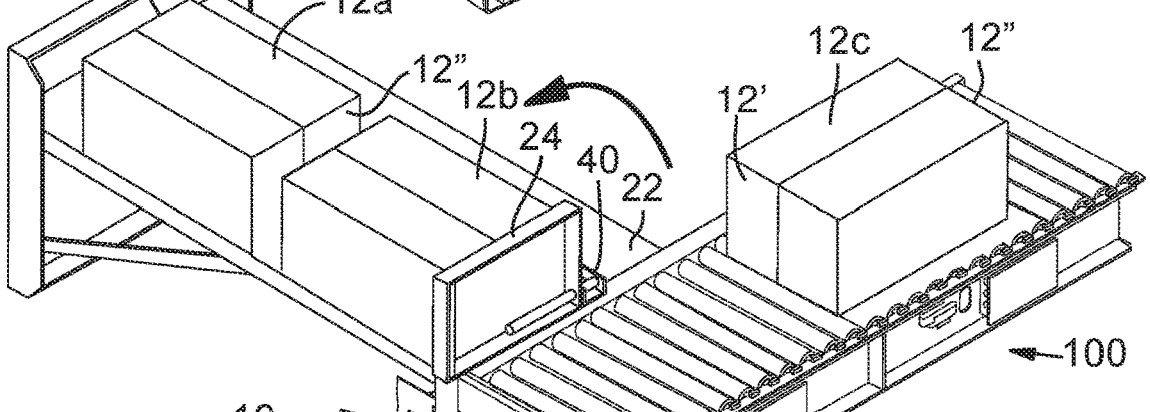
Figure 22:
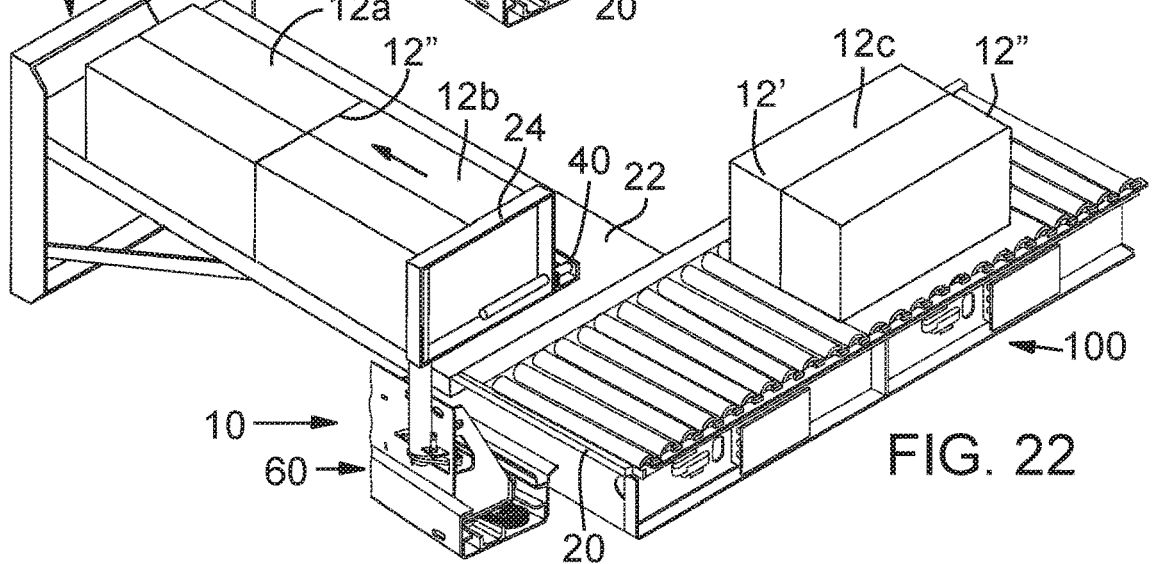

FIG. 18 shows the next operation—shuttling of the case manipulator 10 in the direction shown with the arrow to transfer the now-rotated case 12*a* into a pre-determined position on row accumulator platform 16 according to the build menu 18. As the case manipulator 10 is shuttled the swing plate 24 pushes on the trailing edge 12" of the case—the paddle arm 40 retains the case in a correct position relative to the swing plate. With reference to FIG. 19, once case 12*a* is in the desired location on row accumulator platform 16 the paddle arm 40 and swing plate 24 are simultaneously (or sequentially) pivoted from their second positions to their home positions and the case manipulator 10 is shuttled back to its home position as shown by the arrow in FIG. 19. At the same time, case 12*b* is being moved into position on the infeed conveyer 100 to be operated upon by case manipulator 10, that is, with the leading edge of the case abutting backstop bar 20. The rotation of case 12b is then commenced in the same manner as described above with case 12a as shown in FIGS. 20 and 21. Depending on the build menu, the second case 12b may be moved into an abutting relationship with the first case 12a as shown in FIG. 22, or the build menu may call for a space between cases 12a and 12b as shown in FIG. 21.

Figure 23:
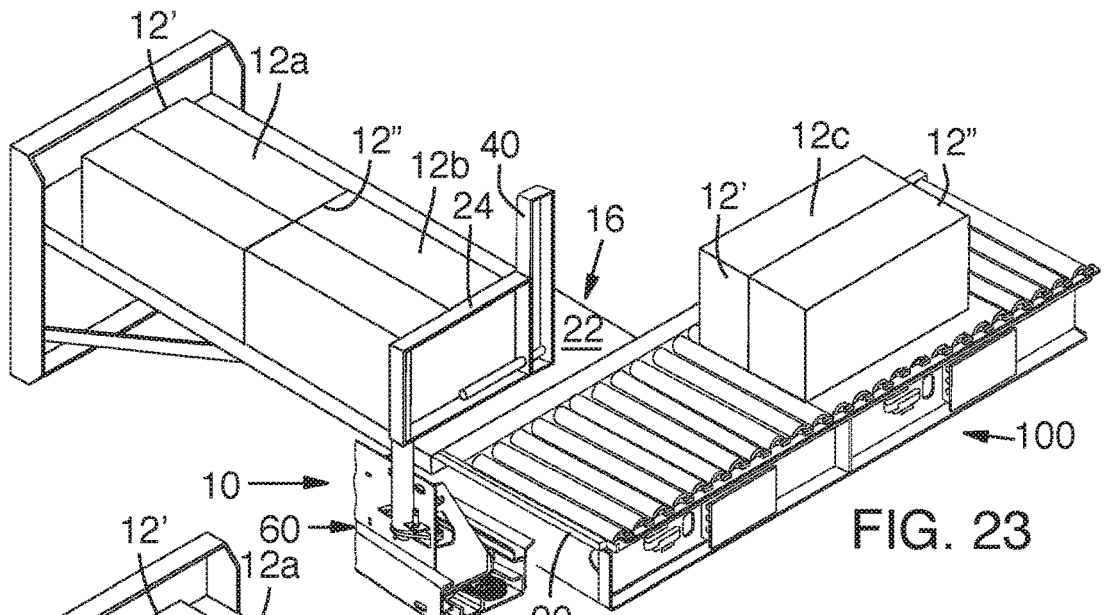
Figure 24:
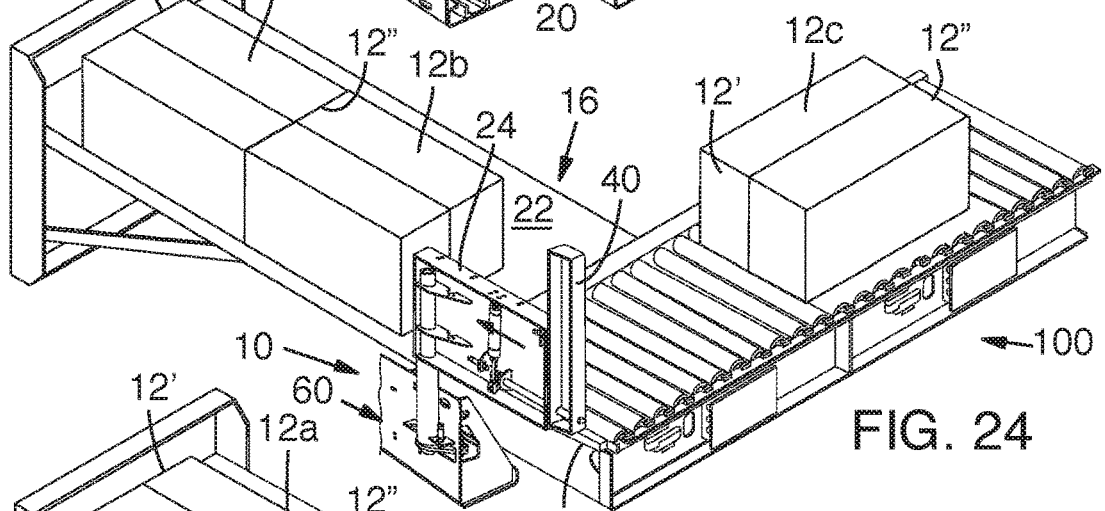

FIGS. 23 and 24 illustrate the pivoting of paddle arm 40 from its second position (FIG. 23) and swing plate 24 to its second position (FIG. 24) after case 12b has been pushed into the pre-determined position on accumulator platform 16.

Figure 25:
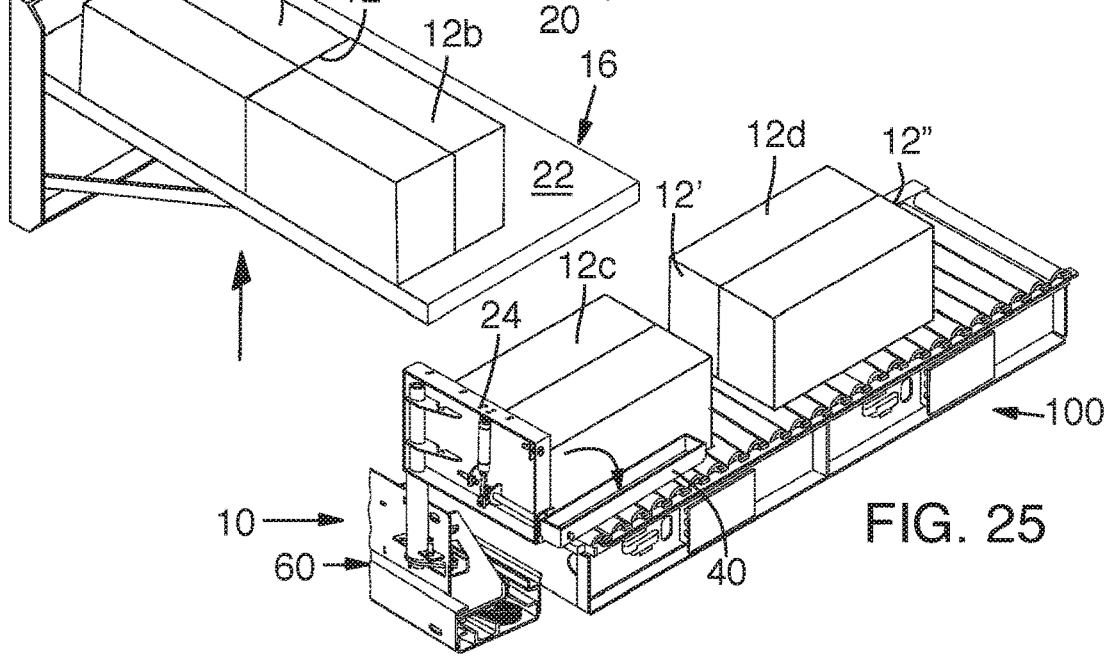

With the row of cases assembled on accumulator platform 16, as shown in FIG. 24, the case manipulator 10 is shuttled back to its home position. In FIG. 25 the row accumulator 16 is being lifted upwardly with the complete row of cases, 12a and 12b, for downstream processing and transfer to the layer head 502 in the same manner as detailed above.

The drawing figures described above illustrate the case manipulator 10 operating on a single case 12 at a time as the case is delivered on the infeed conveyer 100. In the instance of the cases 12 shown in the drawings, the case is relatively large in size and as such a row of cases comprises plural single cases aligned side-by-side into a row as shown in, for example, FIG. 16. But those of skill in the art will understand that the case manipulator 10 of the invention is capable of operating on more than one case at a time, for example, when the individual cases are smaller in size than those shown in the drawings. To illustrate the point, assume that the cases have a length dimension that is ¼ of the length of the cases 12 shown in the drawings of FIGS. 1 through 25. In that situation, the paddle arm 40 when it is in the pivoted position extends along the sides of 4 cases rather than one. The four cases are thus pushed onto the row accumulator platform 16 in a group. The same basic processing continues as described above, including turning 4 of these smaller sized cases at one time with the combined action of the paddle arm 40 and swing plate 24 as detailed above, according to the build menu 18 that is specific for the smaller-sized cases. The ability of case manipulator 10 to manipulate more than one, smaller sized case at one time is illustrated schematically in FIG. 2 with the smaller cases 12x and 12y shown in stack 506.

Figure 26:
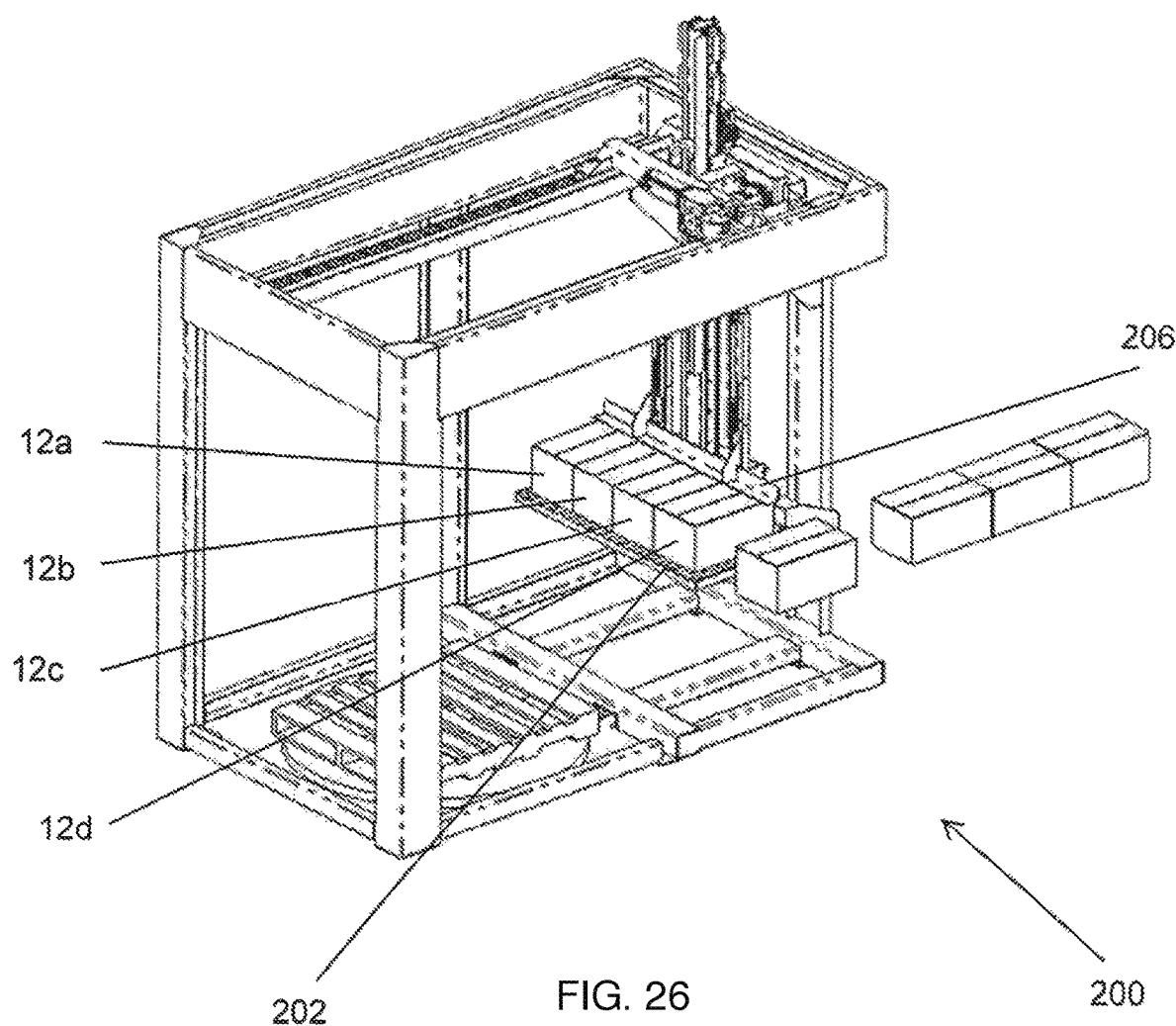
Figure 27:
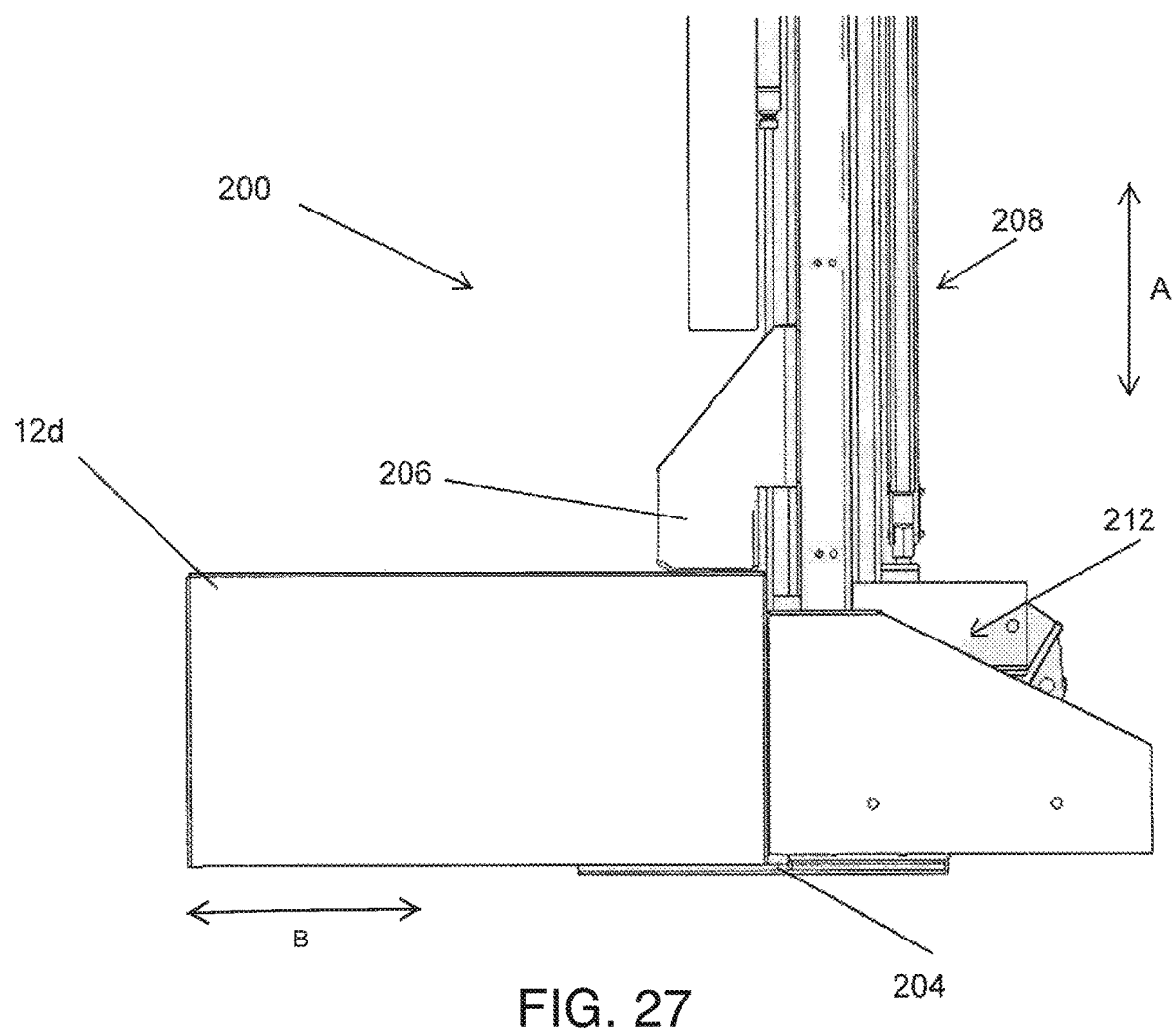
Figure 28:
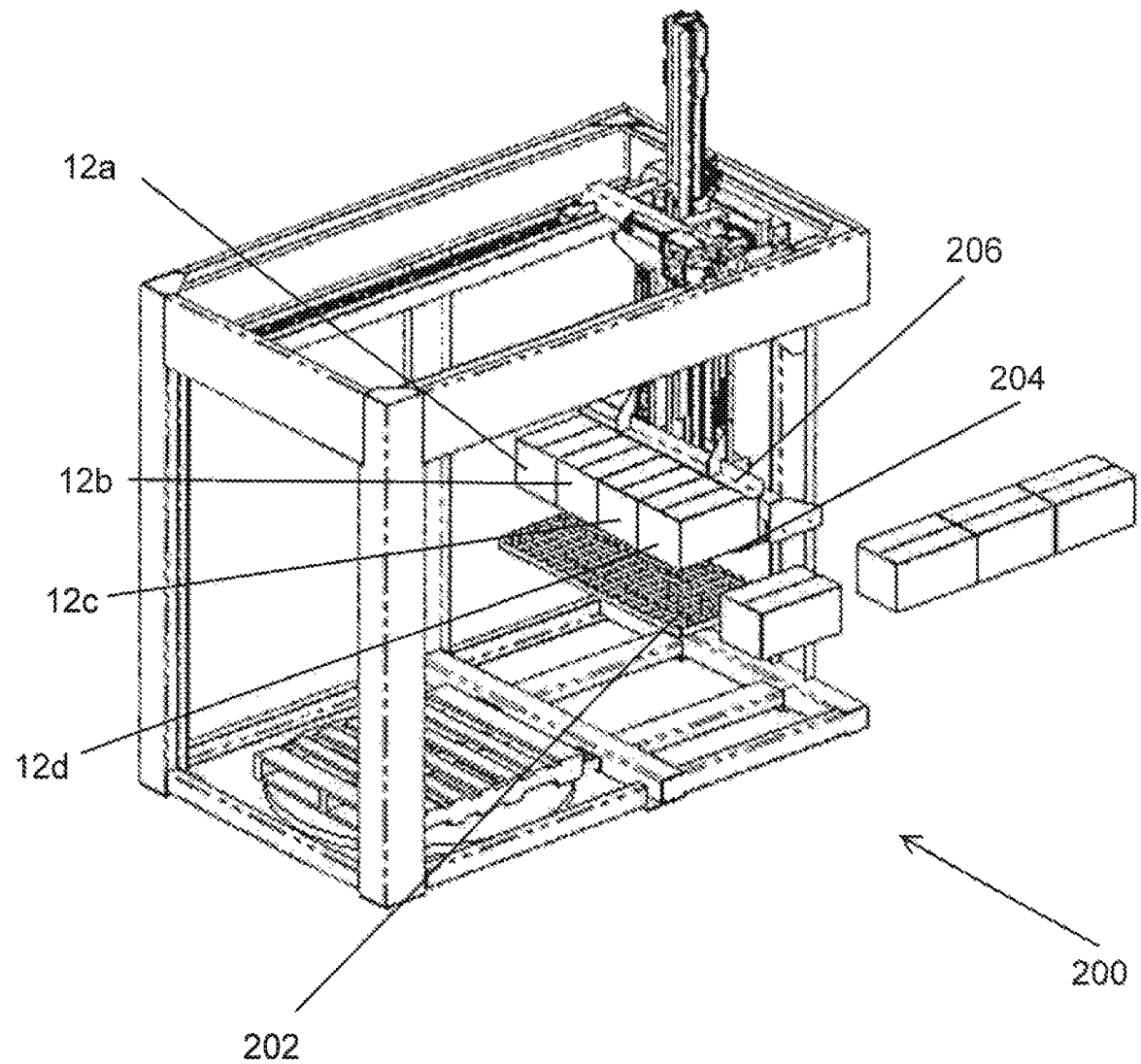

As noted above, as an alternative to the vertically movable row accumulator 16 it is possible to transfer a row of cases 12 that has been assembled on the row accumulator using a pick and place clamp assembly. One embodiment of a pick and place apparatus 200 that may be used in conjunction with a case manipulator 10 according to the present invention is shown in isolation in FIG. 26—in FIG. 26 the case manipulator 10 is not shown in order to illustrate better the components of the apparatus 200. A row of cases 12a through 12d have been assembled on a row build platform 202 utilizing a case manipulator 10 according to the present invention. The row build platform 202 in the illustration of FIG. 26 is a roller conveyer deck defined by plural rollers. The pick and place apparatus 200 is best seen in the side view of FIG. 27 and is defined by a lower support plate 204 and an upper clamp arm 206, both of which are carried on a carriage 208 that allows for both vertical movement (arrow A) and horizontal movement (arrow B). The support plate 204 is also horizontally moveable along the arrow B direction. In operation, when a complete row of cases has been assembled on the row build platform 202 according to the build menu 18 the carriage 208 is operated so that the support plate 204 is positioned adjacent the bottom edges of the assembled cases. An end retaining bar 210 is positioned along the downstream edge of the case 12a. With the upper clamp arm 206 in an upper position (as shown in FIG. 27) the support plate 204 is moved horizontally (arrow B) so that the plate is positioned beneath the bottoms of the aligned cases and the upper clamp arm 206 is moved downwardly (arrow A) against the cases to thereby clamp the entire row onto the support plate 204. At this point the carriage 208 is moved vertically to move the entire clamped row with it, and then horizontally to place the row on a pallet or stack of cases. This movement of the carriage 208 is shown in FIG. 28. Once the carriage is in the desired location for depositing the row on the pallet the upper clamp arm 206 is moved vertically to release pressure on the cases 12 and the support plate 204 is withdrawn from beneath the row of cases to thereby deposit the cases as desired.

In yet another alternative embodiment of a pick and place system, a pair of clamp bars moves over the assembled row of cases with the opposed clamps opened so that they cases fit between the bars. The clamp bars are lowered over the cases and moved inwardly toward one another to capture the cases between the bars. The clamped cases are then lifted upwardly off the row accumulator platform 16 and transferred to a pallet or a stack of cases already assembled on a pallet. It will be appreciated that by positioning both the swing plate 24 and the paddle arm 40 in their home positions (as shown, for example, in FIG. 19), and pick and place clamp bar transport system is capable of being lowered over a row of cases to clamp the row regardless of the position of the trolley 62 relative to the row accumulator platform 16.

In yet another embodiment according to the present invention it is possible to eliminate the paddle arm 40 with a vacuum pad shown schematically in FIG. 7 with phantom lines and identified with reference number 110. The vacuum pad 110 is connected to a vacuum source 112 so that cases may be retained against the major surface 38 as they are manipulated by the movement of the swing plate. More specifically, using the engagement of a case 12 to the swing plate 24 equipped with vacuum pad 110 the trolley 62 may "grip" the case from the infeed conveyer, shuttle the case onto the row build accumulator 16, and rotate the case by 90 degrees as described above but without the paddle arm 40.

Figure 29:
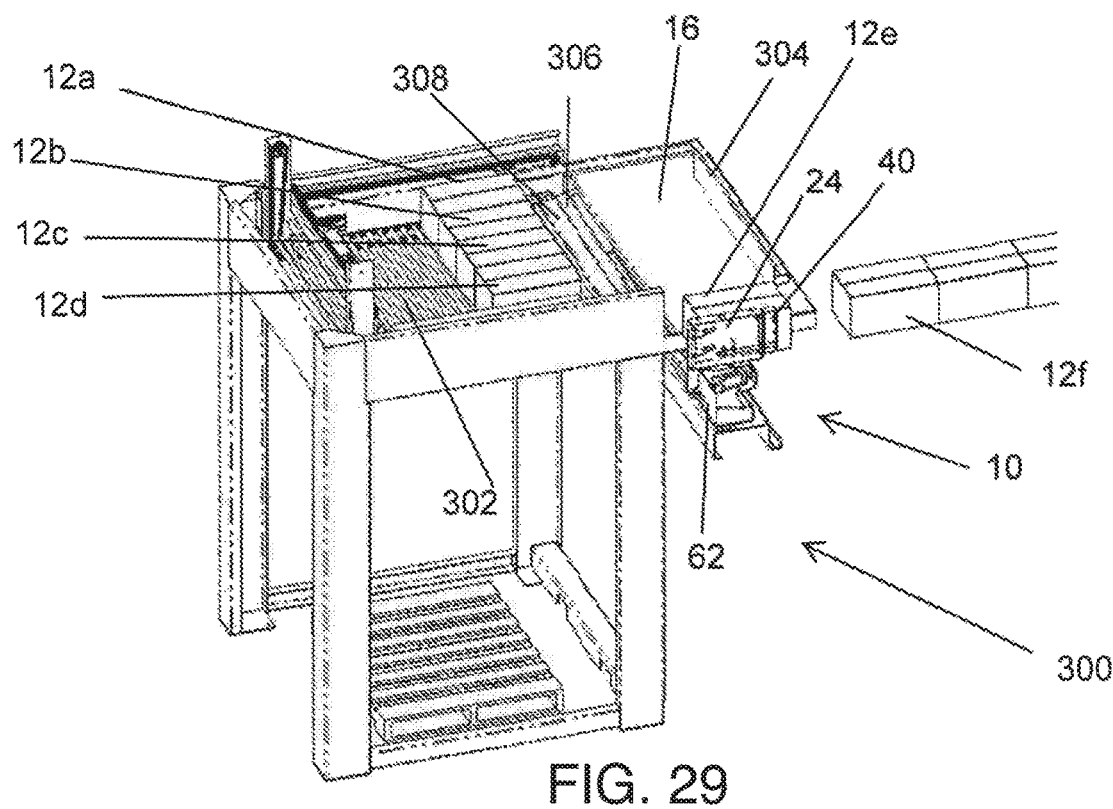
FIG. 29 is a perspective view of yet another alternative apparatus for transporting rows of cases, in this case a high infeed palletizer that utilizes a stationary row accumulator platform that may be used with the case manipulator according to the present invention.
Figure 30:
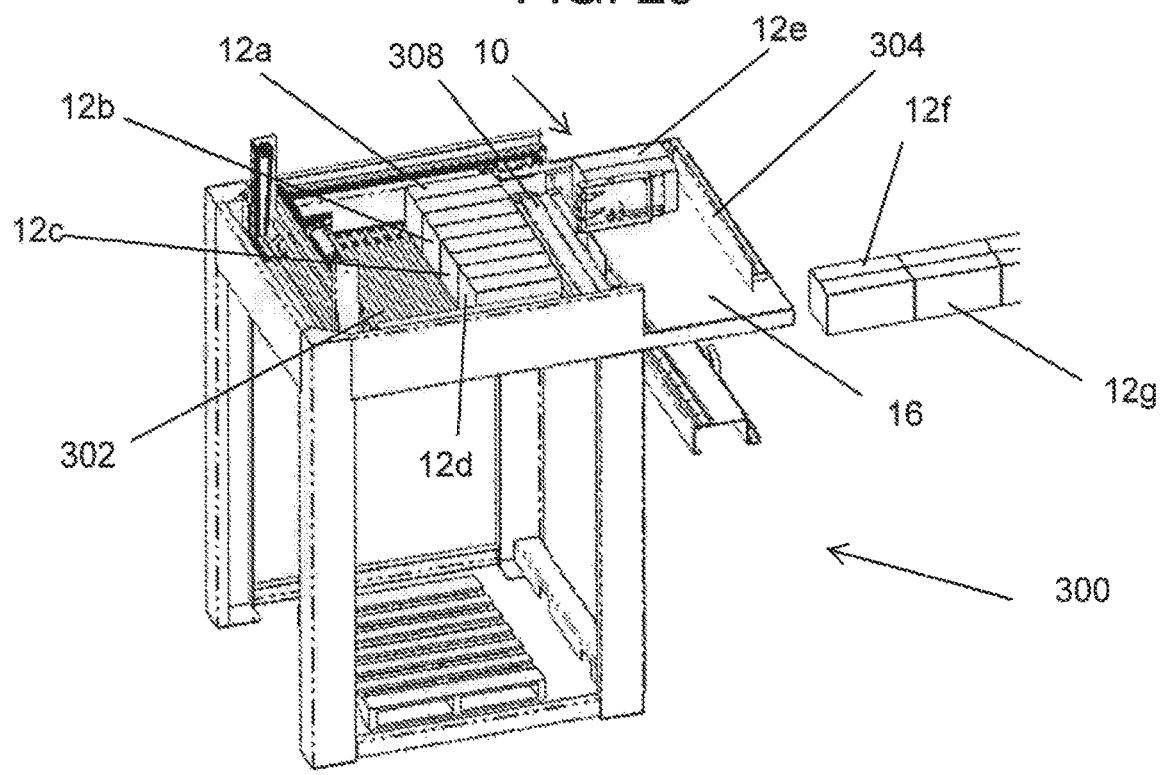
FIG. 30 is another perspective view of the palletizer shown in FIG. 29, illustrating the case manipulator in a different position from the view of FIG. 29.

Turning now to the palletizer 300 shown in FIGS. 29 and 30, the row accumulator platform 16 is stationary and located at an elevated position. A vertically movable layer head 302 is, in the view of FIG. 29, at a position that the layer head is coincident with, or slightly lower than, the elevation of the row accumulator platform 16 so that a row of cases 12 assembled on the row accumulator platform may be pushed by a pusher bar onto the layer head. The carriage assembly 60, trolley 62 and thus swing plate 24 and paddle arm 40 are also positioned at an elevated level adjacent the row accumulator platform 16 so that the swing plate 24 and paddle arm 40 may manipulate cases 12 as described in detail above. The infeed conveyer 100 is not shown in FIGS. 29 and 30 but it may be seen that it also is at the elevated position as shown by cases 12f and 12g which are at the level of the infeed conveyer 100.

In FIG. 29 the case manipulator 10 is in the home position, the swing plate 24 is in the pivoted position and the paddle arm 40 is in a home position—the trolley 62 is ready to push the case 12e onto the row build accumulator 16. A row of cases, 12a through 12d, has already been pushed onto the layer head 302 by pusher arm 304—the assembled row of cases is pushed from the row accumulator platform 16 across a narrow gap 306 onto the layer head. The gap 306 is needed for a plate post 308.

In FIG. 30 the trolley 62 has been shuttled from the home position to move case 12e onto the desired position on row accumulator platform 16. The next following case 12f on infeed conveyer 100 is ready to be moved to the distal end of the infeed conveyer and the case manipulator 10 will simultaneously be shuttled back to its home position (with the swing plate 24 and paddle arm 40 being moved to their home positions so that they do not interfere with case 12f as the trolley 62 moves the swing plate past case 12f). It will be appreciated that when a complete layer has been assembled on the layer head 302 the layer head is moved vertically downward to deposit the full layer on the pallet or on the stack that is being built.

The foregoing system and methods allow for accurate positioning of a case on the row accumulator platform 16 before the next case 12 is induced onto the row build accumulator. In some instances the build menu 18 will call for the next case 12b to be immediately adjacent the prior case 12a so that there is no gap between the two cases 12a and 12b. In other instances, the build menu 18 will call for a gap between the cases. In the latter case where a gap is required the gap is created by ceasing motion of the case manipulator 10 when the system recognizes the trailing edge 12" to be in the desired position according to the build menu.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A palletizer item row building apparatus for arranging items into rows, each item having a trailing edge and a leading edge, comprising:
    an infeed conveyer for delivering items at a first level and in a first orientation;
    a row accumulator having a row build surface and the row accumulator defining a longitudinal axis;
    an item manipulator adapted for receiving an item from the infeed conveyer and for positioning the item on the row accumulator, the item manipulator comprising:
        a carriage mounted on a linear track and adapted for reciprocating linear movement along the longitudinal axis;
        an item turner movable from a first position to a second position, the item turner defined by a stop that is pivotally mounted for movement about an item turner axis and an arm that is movable between a first position in which the arm is separated from the row accumulator and a second position in which the arm extends over the row accumulator, wherein when the item turner moves from the first position to the second position an item received by the item turner is moved from the first orientation to a second orientation; and
        a trailing edge detector which determines the position of the trailing edge of the item; and
    a controller associated with the encoder of the item manipulator which associates the position of the item manipulator with the position of the item.

2. The item row building apparatus according to claim 1 including a motor for moving the carriage and wherein the trailing edge detector further comprises an encoder in the motor.

3. The item row building apparatus according to claim 2 in which the encoder determines the position of the first plate.

4. The item row building apparatus according to claim 2 in which the encoder determines the position of the item turner.

5. The item row building apparatus according to claim 1 in which the item turner is further defined by a swing plate mounted to the carriage at a pivot that defines the item turner axis, the swing plate pivotally mounted for movement on the pivot about the item turner axis between a first position in which the swing plate is separated from the row accumulator and a second position in which the swing plate extends over the row build surface.

6. The item row building apparatus according to claim 5 in which the item manipulator is further defined by a paddle arm mounted to the swing plate on a paddle arm pivot defining a paddle arm axis that is transverse to the swing plate axis, the paddle arm pivotally mounted for movement of the pivot arm about the paddle arm axis between a first position in which the paddle arm is separated from the row accumulator and a second position in which the paddle arm extends over the row build surface.

7. The row building apparatus according to claim 6 in which the carriage is movable from a first position to a second position and when the carriage is in the first position and the paddle arm is in the second position the paddle arm is adapted for engaging an item on the infeed conveyer.

8. A method of orienting items in rows in a palletizer, each item having a leading edge and a trailing edge, comprising the steps of:
    a. delivering at least a first item to a stop position on an infeed conveyer;
    b. confirming a first orientation of the first item in the stop position;
    c. determining if the first item requires reorientation from the first orientation to a second orientation;
    d. if the first item requires reorientation, causing the first item to be reoriented from the first orientation to the second orientation with an item turner and delivering the reoriented first item from the infeed conveyer to a row build conveyer;
    e. if the first item does not require reorientation, delivering the first item from the infeed conveyer to the row build conveyer with the item turner; and
    f. in steps d. and e., determining the position of the trailing edge of the item with a determined position of the item turner.

9. The method according to claim 8 wherein the reorientation of step d. comprises rotating the item by 90 degrees.

10. The method according to claim 8 wherein the method comprises orienting plural items simultaneously and the reorientation of step d. comprises rotating plural items simultaneously by 90 degrees.

11. The method according to claim 8 including the step of moving the first item on the row build conveyer to a predetermined position according to a row build menu.

12. The method according to claim 11 including the step of detecting the location of the trailing edge in order to determine the position to which the first item is delivered to the row build conveyer.

13. The method according to claim 12 including delivering the item to the row build conveyer with a plate that is driven by a motor and detecting the location of the trailing edge with an encoder in the motor.

14. A method of orienting items for building rows of items in a palletizer, comprising the steps of:

a. delivering an item in a first orientation on an infeed conveyer;
b. determining if the first orientation matches a first item predetermined orientation according to a row build menu;
c. determining if the first item requires reorientation to match the first item predetermined orientation according to the row build menu;
d. if the first item requires reorientation to match the first item predetermined orientation, causing the first item to be reoriented from the first orientation to a second orientation with an item turner and delivering the reoriented first item to a row build conveyer;
e. if the first item does not require reorientation, delivering the first item to the row build conveyer with the item turner; and
f. in steps d. and e., determining the position of the trailing edge of first item with a determined position of the item turner.

15. The method according to claim 14 including the steps of:
a. delivering a second item in a first orientation on the infeed conveyer;
b. determining if the first orientation of the second item matches a second item predetermined orientation according to the row build menu;
c. if the second item requires reorientation to match the second item predetermined orientation, causing the second item to be reoriented from the first orientation to a second orientation and delivering the second item to the row build conveyer in a predetermined location relative to the first item on the row build conveyer;
d. if the second item does not require reorientation, delivering the second item to the row build conveyer in a predetermined location relative to the first item on the row build conveyer; and
in steps c. and d., determining the position of the trailing edge of first item with a determined position of the item turner.

16. The method according to claim 15 including a delivering the first item to the row build conveyer with a motor driving the item turner and wherein the location of the trailing edge of the first item on the row build conveyer is detected by an encoder in the motor.

17. The method according to claim 16 including the step of delivering the second item to the row build conveyer in a desired position relative to the first item according to a row build menu.

18. The method according to claim 17 in which a leading edge of the second item abuts the trailing edge of the first item when the second item is delivered to the row build conveyer in the desired position of the second item relative to the first item.

19. The method according to claim 17 in which a leading edge of the second item is spaced apart from the trailing edge of the first item when the second item is delivered to the row build conveyer in the desired position of the second item relative to the first item.

* * * * *